(12) United States Patent  
Mori

(10) Patent No.: US 7,508,543 B2  
(45) Date of Patent: Mar. 24, 2009

(54) IMAGE PROCESSOR, IMAGE PROCESSING METHOD, AND RECORDING MEDIUM ON WHICH IMAGE PROCESSING PROGRAM IS RECORDED

(75) Inventor: Kenji Mori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 856 days.

(21) Appl. No.: 10/807,441

(22) Filed: Mar. 24, 2004

(65) Prior Publication Data

US 2004/0213457 A1   Oct. 28, 2004

(30) Foreign Application Priority Data

Apr. 10, 2003   (JP) ............................. 2003-106591

(51) Int. Cl.
| | |
|---|---|
| G06F 15/00 | (2006.01) |
| G06K 1/00 | (2006.01) |
| H04N 1/60 | (2006.01) |
| H04N 1/405 | (2006.01) |

(52) U.S. Cl. ........................................ 358/1.9; 358/3.1
(58) Field of Classification Search ................... 358/1.9, 358/1.1, 2.1, 3.01, 3.06, 3.08, 3.1, 3.13; 382/167
See application file for complete search history.

(56) References Cited

U.S. PATENT DOCUMENTS

| 4,908,701 A | * | 3/1990 | Udagawa ..................... 358/520 |
| 5,408,267 A | * | 4/1995 | Main ........................... 348/254 |
| 5,872,643 A | * | 2/1999 | Maeda et al. ............... 358/518 |
| 6,046,820 A | * | 4/2000 | Konishi ....................... 358/1.9 |
| 6,825,958 B1 | * | 11/2004 | Fukasawa et al. ........... 358/523 |

FOREIGN PATENT DOCUMENTS

| JP | 10191090 A | * | 7/1998 |
| JP | A 10-191090 | | 7/1998 |
| JP | 10208034 A | * | 8/1998 |
| JP | A 10-208034 | | 8/1998 |
| JP | A 2001-343957 | | 12/2001 |
| JP | A 2002-44451 | | 2/2002 |

* cited by examiner

*Primary Examiner*—Douglas Q Tran  
(74) *Attorney, Agent, or Firm*—Oliff & Berridge, PLC

(57) ABSTRACT

To provide an image processor, an image processing method, and an image processing program which make it possible to perform high-speed image correction suitable for motion pictures while reducing a memory resource, etc., an image processor that corrects input image data having a predetermined grayscale range is provided. The image processor includes a coefficient holding device to hold correction coefficients of a correction curve that corresponds to the entire grayscale range or a portion of the grayscale range and includes one or more correction points and a combination portion that is formed of a combination of a plurality of specific curve pattern portions, a correction amount determination device to determine a correction amount based on statistical information of grayscale values of pixels in the image input data, and a correction device to correct the input image data by adding the product of the correction amount and the correction coefficients determined by the input image data to the input image data.

16 Claims, 22 Drawing Sheets

IMAGE PROCESSOR, IMAGE PROCESSING METHOD, AND RECORDING MEDIUM ON WHICH IMAGE PROCESSING PROGRAM IS RECORDED

BACKGROUND OF THE INVENTION

1. Field of Invention

The present invention relates to an image correction technology that performs correction processes on input images from various sources.

2. Description of Related Art

There are image processors that receive image data from various image input devices, such as digital cameras, and perform correction processes, e.g., a contrast correction process and a luminance correction process. In such an image correction process, the grayscale of an input image is generally corrected according to a predetermined correction curve. Specifically, correction curve data that specifies a correction curve is previously stored in a memory, such as a lookup table (LUT), and input image data correction is performed with reference to the LUT.

Also, a method of determining a correction curve according to the contents of input image data, e.g., luminance distribution, has been suggested. See Japanese Unexamined Patent Application Publication No. 10-208034.

SUMMARY OF THE INVENTION

If a predetermined correction curve is stored in the LUT, memory capacity to store the correction curve is required. In a method of determining the correction curve according to the input image data, computation, such as interpolation processing, is needed to determine the correction curve. As a result, it is difficult to correct the input image data in real time. In particular, it is impossible to apply the method to motion pictures.

The present invention is designed to address the above described problems, reduce a memory resource, and make it possible to perform image correction at the high processing speeds required for motion pictures.

According to one aspect of the present invention, there is provided an image processor that corrects input image data having a predetermined grayscale range. The image processor includes a coefficient holding device, a correction amount determination device, and a correction device. The coefficient holding device holds correction coefficients of a correction curve that corresponds to the entire grayscale range or a portion of the grayscale range and includes one or more correction points and a combination portion that is formed of a combination of a plurality of specific curve pattern portions. The correction amount determination device determines a correction amount based on statistical information of grayscale values of pixels in the input image data. The correction device corrects the input image data by adding the product of the correction amount and the correction coefficients determined by the input image data to the input image data.

Also, according to the aspect of the present invention, there is provided an image processing method that corrects input image data having a predetermined grayscale range. The image processing method includes: holding correction coefficients of a correction curve that correspond to the entire grayscale range or a portion of the grayscale range and include one or more correction points and a combination portion that is formed of a combination of a plurality of specific curve pattern portions; determining a correction amount based on statistical information of grayscale values of pixels in the image input data; and performing grayscale correction on the input image data by adding the product of the correction amount and the correction coefficients determined by the input image data to the input image data.

Also, according to an aspect of the present invention, there is provided a computer-readable recording medium on which an image processing program is recorded, the image processing program correcting input image data having a predetermined grayscale range and being executable by a computer. The program includes: a process to hold correction coefficients of a correction curve that correspond to the entire grayscale range or a portion of the grayscale range and include one or more correction points and a combination portion that is formed of a combination of a plurality of specific curve pattern portions; a process to determine a correction amount based on statistical information of grayscale values of pixels in the input image data; and a process to perform grayscale correction on the input image data by adding the product of the correction amount and the correction coefficients determined by the input image data to the input image data.

According to the image processor, the image processing method, and the image processing program, input image data having a predetermined grayscale range is corrected. For example, the predetermined grayscale range may extend from 0 to 255 grayscales in the case of 8-bit input image data. In addition, correction on the input image data may include contrast correction, brightness correction, and chroma correction. Changing grayscale values of the input image data according to a predetermined correction curve performs such correction. Herein, the correction curve corresponds to the entire grayscale range or to a portion of the grayscale range. The correction curve may be set with respect to the entire grayscale range or a portion of the grayscale range. When the correction curve is set with respect to a portion of the grayscale range, a grayscale range, other than the grayscale range corresponding to the correction curve, may be corrected by another correction method using a correction straight line, for example. The correction curve includes one or more correction points and a combination portion formed of a combination of a plurality of specific curve pattern portions. For example, the specific curve pattern portion may be a repetitive portion of a sine wave and include portions that have the same curve pattern but different in polarity.

Correction curve data itself is not held, but the correction curve is held in the form of a correction coefficient that specifies the correction curve. Also, during correction, grayscale correction on the input image data is performed by adding the product of the correction amount and the correction coefficients determined by the input image data to the input image data.

Thus, it is not necessary to generate the correction curve data by performing a complex interpolation operation based on fixed points and correction points that specify the correction curve and to store all the generated correction curve data in a memory. Therefore, it possible to simplify the configuration of an image processor. In addition, since correction processing itself can be performed by a product sum operation using correction coefficients, it is possible to perform high-speed correction.

In one aspect of the image processor, the coefficient holding device holds only the correction coefficients corresponding to one of the specific curve pattern portions in the combination portion, and the correction device includes a device to generate correction coefficients corresponding to the combination portion based on the correction coefficients corresponding to the specific curve pattern portion. In this aspect, instead of holding and storing correction coefficient data corresponding to the entire combination portion of the correction curve, which is formed of a combination of the same curve patterns, only the correction coefficients corresponding to a basic curve pattern portion is held. Correction coefficients corresponding to the remaining portions, other than the basic curve pattern portion, are generated based on the held correction coefficients, thereby performing correction processing. Accordingly, it is possible to reduce the capacity of a memory in which correction coefficients are stored or to simplify a circuit configuration.

In one aspect of the image processor, the combination portion includes a portion symmetric with the specific curve pattern portion with respect to a horizontal axis or a vertical axis of the correction curve used as a reference axis. Thus, it is not necessary to hold and store correction coefficients corresponding to a portion obtained by symmetrically changing the specific curve pattern with respect to a reference axis corresponding to a certain input grayscale value or a portion obtained by inverting the polarity of the specific curve pattern. For example, when the correction curve takes the form of a sine wave, only the correction coefficients corresponding to a curve pattern portion corresponding to a quarter of a period of the sine wave is held and is folded in the X-axis direction or the Y-axis direction, thereby obtaining a correction curve corresponding to one period of the since wave.

In one aspect of the image processor, the correction points are two points that are symmetric with respect to the center of the grayscale range. The coefficient holding device holds correction coefficients that make absolute values of the correction amount at the two points equal and have opposite polarities at the two points. Since the correction curve has repetitive patterns corresponding to half the grayscale range, the number of correction coefficients to be held decreases.

In one aspect of the image processor, the correction points are two points that are a quarter of the lower limit of the grayscale range and a quarter of the upper limit of the grayscale range. The coefficient holding device holds correction coefficients that make the absolute values of the correction amount at the two points equal and have opposite polarities at the two points. Since the correction curve has repetitive patterns corresponding to a quarter of the grayscale range, the number of correction coefficients to be held decreases.

In one aspect of the image processor, the correction point is one of the two points that are symmetric with respect to the center of the grayscale range. Thus, the number of correction coefficients to be held with respect to the symmetric point can be reduced by half.

In one aspect of the image processor, the correction device performs luminance correction and color difference correction on the input image data using the same correction coefficients held by the coefficient holding device. Also, in this case, the correction device may simultaneously perform the luminance correction and the color difference correction by time-divisionally referring to the coefficient holding device.

According to another aspect of the present invention, there is provided an image processor that corrects input image data having a predetermined grayscale range. The image processor includes a coefficient holding device, a correction curve data generating device, and a correction device. The coefficient holding device holds correction coefficients of a correction curve that corresponds to the entire grayscale range or a portion of the grayscale range and includes one or more correction points and a combination portion that is formed of a combination of a plurality of specific curve pattern portions. The correction curve data generating device generates and stores correction curve data with respect to all grayscale values corresponding to the grayscale range with reference to the coefficient holding device by adding the product of the correction amount and the correction coefficient corresponding to each of the grayscale values to each of the grayscale values. The correction device performs grayscale correction on the input image data with reference to the correction curve data.

According to an aspect of the present invention, there is provided an image processing method that corrects input image data having a predetermined grayscale range. The image processing method includes: holding correction coefficients of a correction curve that corresponds to the entire grayscale range or a portion of the grayscale range and includes one or more correction points and a combination portion that is formed of a combination of a plurality of specific curve pattern portions; generating and storing correction curve data with respect to all grayscale values corresponding to the grayscale range with reference to the coefficient holding device by adding the product of the correction amount and the correction coefficient corresponding to each of the grayscale values to each of the grayscale values; and performing grayscale correction on the input image data with reference to the correction curve data.

Also, according to an aspect of the present invention, there is provided a computer-readable recording medium on which an image processing program is recorded, the image processing program correcting input image data having a predetermined grayscale range and being executable by a computer. The program includes: a process to hold correction coefficients of a correction curve that correspond to the entire grayscale range or a portion of the grayscale range and include one or more correction points and a combination portion that is formed of a combination of a plurality of specific curve pattern portions; a process to generate and store correction curve data with respect to all grayscale values corresponding to the grayscale range with reference to the coefficient holding device by adding the product of the correction amount and the correction coefficient corresponding to each of the grayscale values to each of the grayscale values; and a process to perform grayscale correction on the input image data with reference to the correction curve data.

According to the image processor, the image processing method, and the image processing program, input image data having a predetermined grayscale range is corrected. For example, the predetermined grayscale range may extend from 0 to 255 grayscales in the case of 8-bit input image data. In addition, correction on the input image data may include contrast correction, brightness correction, and chroma correction. Changing grayscale values of the input image data, according to a predetermined correction curve, performs such correction. Here, the correction curve corresponds to the entire grayscale range or a portion of the grayscale range. The correction curve may be set with respect to the entire grayscale range or a portion of the grayscale range. When the correction curve is set with respect to a portion of the grayscale range, the remaining portions, other than the grayscale range corresponding to the correction curve, may be corrected by another correction method using a correction straight line, for example. The correction curve includes one or more correction points and a combination portion formed of a combination of a plurality of specific curve pattern portions. For example, the specific curve pattern portion may be a repetitive portion in a sine wave and include portions that have the same curve pattern but different in polarity.

In this correction curve, correction curve data is previously generated and held, and correction is performed on every input image date with reference to the correction curve data.

The correction curve data is generated with respect to all grayscale values corresponding to the grayscale range with reference to the coefficient holding device by adding the product of the correction amount and the correction coefficient corresponding to each of the grayscale values to each of the grayscale values.

Thus, since it is not necessary to perform a computation to correct every input image data, power consumption can be reduced.

In one aspect of the image processor, the correction points are two points that are symmetric to the center of the grayscale range, and the coefficient holding device holds correction coefficients that make absolute values of the correction amount at the two points equal and have opposite polarities at the two points. Since the correction curve has repetitive patterns corresponding to half the grayscale range, the number of correction coefficients to be held decreases.

In one aspect of the image processor, the correction points are two points that are a quarter of the lower limit of the grayscale range and a quarter of the upper limit of the grayscale range, and the coefficient holding device holds correction coefficients that make absolute values of the correction amount at the two points equal and have opposite polarities at the two points. Since the correction curve has repetitive patterns corresponding to a quarter of the grayscale range, the number of correction coefficients to be held decreases.

In one aspect of the image processor, the correction point is one of the two points that are symmetric with respect to the center of the grayscale range. Thus, the number of correction coefficients to be held with respect to the symmetric point can be reduced by half.

In one aspect of the image processor, the correction on the input image data includes chroma correction that corrects two color difference data of the input image data, and the correction device performs correction on the two color difference data by time-divisionally referring to the same correction curve data. Since it is not necessary to hold correction curve data for every two color difference data, the required memory size can be reduced.

DETAILED DESCRIPTION OF EXEMPLARY EMBODIMENTS

Hereinafter, exemplary embodiments of the present invention will be described with reference to the accompanying drawings.

Figure 1:
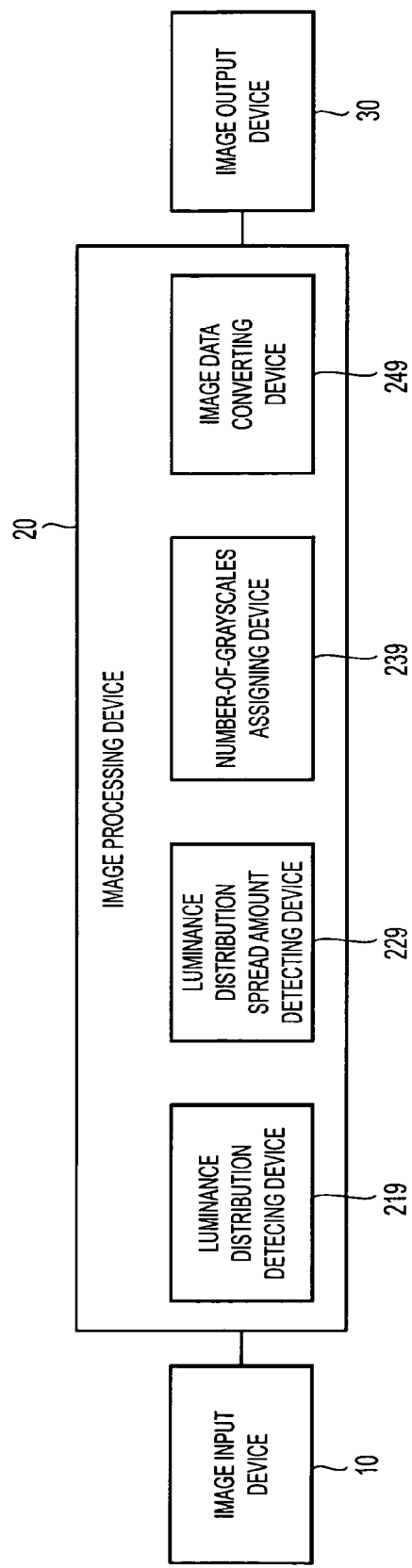
FIG. 1 is a schematic of the configuration of an image processing system according to an aspect of the present invention.
Figure 2:
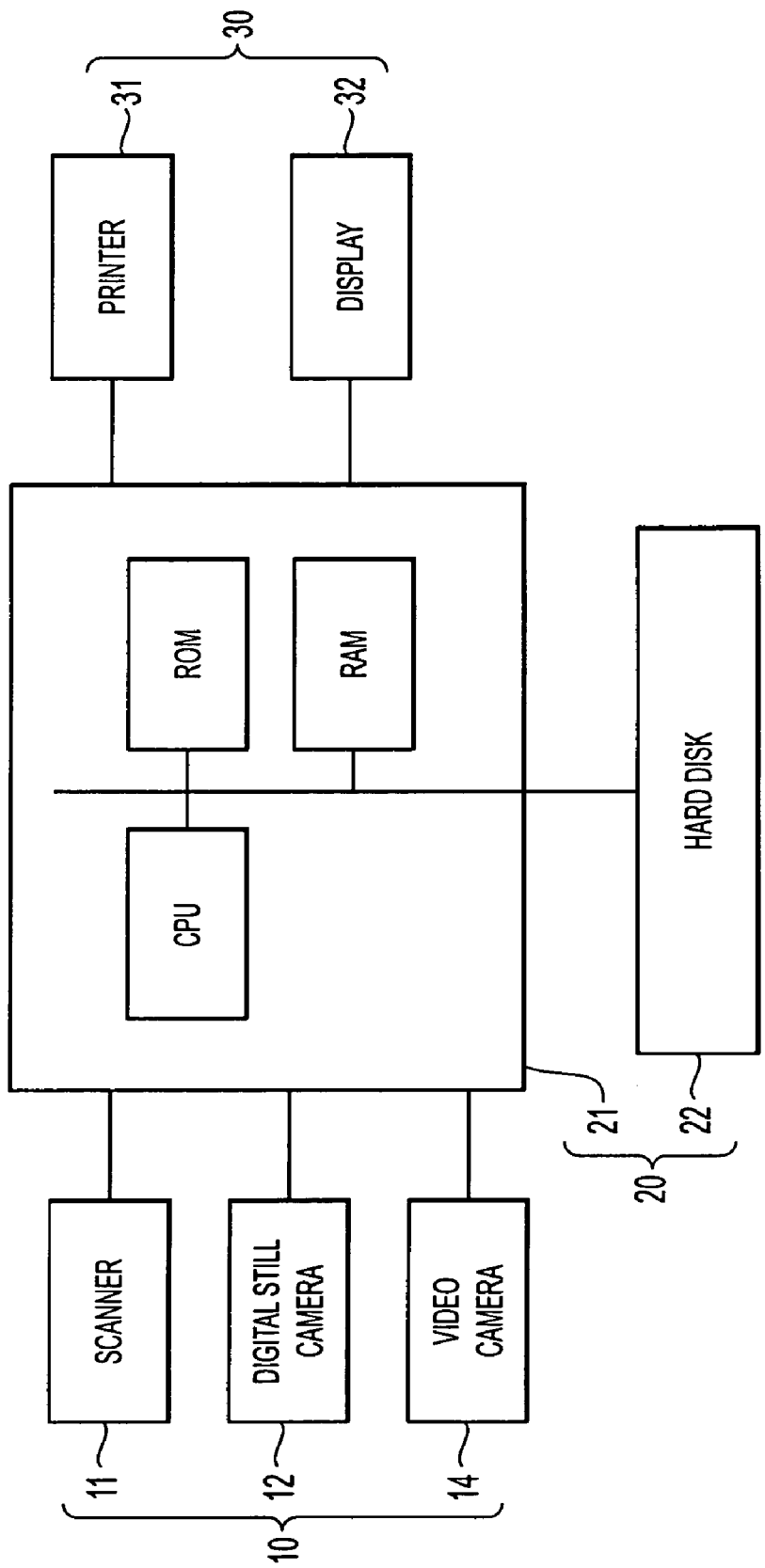
FIG. 2 is a schematic of the detailed configuration of the image processing system shown in FIG. 1.

FIG. 1 is a schematic illustrating an image processing system according to an exemplary embodiment of the present invention. FIG. 2 is a schematic illustrating an exemplary hardware configuration.

In FIG. 1, an image input device 10 outputs image data to an image processor 20 by picking up an image, the image processor 20 performs image processing, such as emphasis on contrast, and outputs the processed image data to an image output device 30. The image output device 30 displays the contrast-emphasized image.

A scanner 11, a digital still camera 12, or a video camera 14, as shown in FIG. 2, may be a typical example of the image input device 10. Also, since the present invention is useful in correcting motion pictures, cameras of portable phones and image apparatus, such as DVD players, may be used as the image input device 10. Furthermore, images transmitted from network apparatus or images transmitted via waves can be used as input images from the image input device 10.

A computer system including a computer 21 and a hard disk 22 corresponds to a specific example of the image processor 20. A printer 31 or a display 32 corresponds to a specific example of the image output device 30, but color copiers, color facsimiles, or liquid crystal panels, organic EL panels, and projectors as display devices can be used as the image output device 30.

In the image processing system according to the exemplary embodiment of the present invention, as an example of image correction, the optimum contrast is provided to an image having low contrast. Accordingly, image data scanned from pictures by the scanner 11, functioning as the image input device 10, image data having low contrast photographed by the digital still camera 12, or motion pictures photographed by the video camera 14 are processed and input to the computer system as the image processor 20.

The image processor 20 includes at least a luminance distribution detecting device 219 to detect luminance distribution, a luminance distribution spread amount detecting device 229 to detect the spread amount of luminance distribution based on the previously detected luminance distribution, a number-of-grayscales assigning device 239 to assign a large number of grayscales to a scope where distribution density is high and to assign a small number of grayscales to a scope where distribution density is low, based on the detected spread amount of luminance distribution, and an image data converting device 249 to convert image data based on the assigned grayscales of luminance. Also, the image processor 20 may include a color converting device to correct color difference between different models and a resolution converting device to convert resolution according to different models. In the present exemplary embodiment, the computer 21 executes image-processing programs stored in an internal ROM or on the hard disk 22 while using a RAM.

Results of executing the image processing programs can be obtained as contrast-emphasized image data, as will be described below, and is then printed by the printer 31, as the image output device 30, or is displayed on the display 32 as the image output device 30 based on the obtained image data. Also, specifically, the obtained image data is grayscale data R, G, and B (green, blue, and red), and images are composed of dot matrix data that is formed of a lattice shape where data is arranged in height and width directions.

First Exemplary Embodiment

Figure 3:
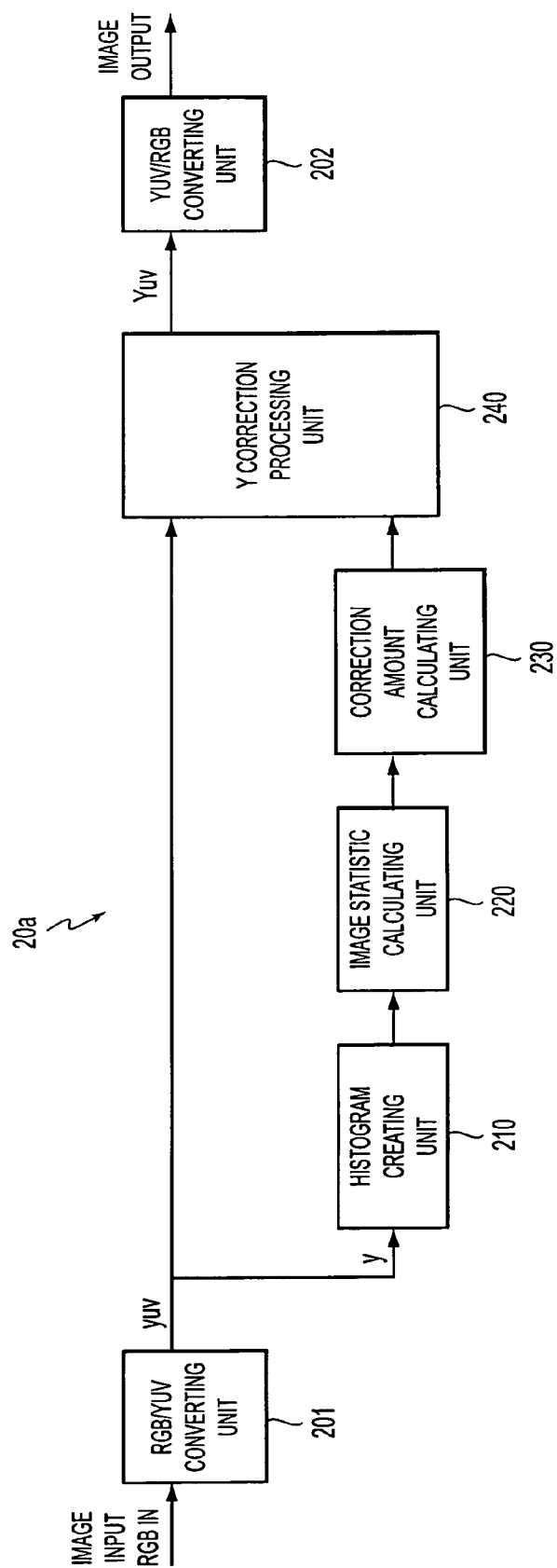
FIG. 3 is a schematic of the configuration of an image processor according to a first exemplary embodiment of the present invention.

Next, a first exemplary embodiment of the present invention will be described. FIG. 3 illustrates an exemplary configuration of an image processor 20a according to the first exemplary embodiment of the present invention. The image processor 20a is an example of the image processor 20 shown in FIG. 1, receives an image input RGB_IN from the image input device 10, and outputs an image output RGB_OUT to the image output device 30.

As shown in FIG. 3, the image processor 20a according to the first exemplary embodiment of the present invention includes an RGB/YUV converting unit 201, a histogram creating unit 210, an image-statistic calculating unit 220, a correction amount calculating unit 230, a Y correction processing unit 240, and a YUV/RGB converting unit 202. Here, the configuration of FIG. 3 has such a relationship with the basic configuration of FIG. 1 that the histogram creating unit 210 corresponds to the luminance distribution detecting device 219, the image statistic calculating unit 220 corresponds to the luminance distribution spread amount detecting device 229, the correction amount calculating unit 230 corresponds to the number-of-grayscales assigning device 239 and the Y correction processing unit 240 corresponds to the image data converting device 249.

The RGB/YUV converting unit 201 converts the image input RGB_IN, which is RGB data, into luminance (Y) and color difference (U, V) data (hereinafter, referred to as "YUV data"). The RGB data is converted into the YUV data as follows.

$Y=+0.2990R+0.5870G+0.1140B$ $U=-0.1684R-0.3316G+0.5000B$ $V=+0.5000R-0.4187G-0.0813B$

The histogram creating unit 210 creates a histogram of the obtained Y (luminance) data, and the image-statistic calculating unit 220 calculates image statistic based on the histogram. The correction amount calculating unit 230 calculates the correction amount of Y (luminance) data based on the image statistic and provides the calculated correction amount to the Y correction processing unit 240.

The YUV data is provided from the RGB/YUV converting unit 201 to the Y correction processing unit 240, and the Y correction processing unit 240 performs correction on Y data based on the calculated correction amount. The YUV data including the corrected Y (luminance) data is transmitted to the YUV/RGB converting unit 202.

The YUV/RGB converting unit 202 converts the YUV data, which has been corrected by the Y correction processing unit 240, into the image output RGB_OUT, which is RGB data, and outputs the image output RGB_OUT. The YUV data is converted into the RGB data as follows.

$R=Y+1.4020V$ $G=Y-0.3441U-0.7139V$ $B=Y+1.7718U-0.0012V$

Since the present invention performs image correction processing for motion pictures, it may be assumed that frame data having a predetermined reproduction period of time is continuously input as the image input RGB_IN.

For this reason, if the correction amount calculating unit 230 does not rapidly calculate the correction amount and the Y correction processing unit 240 does not rapidly performs the correction processing after the histogram creating unit 210 creates a histogram for frame data of one frame, it is impossible to maintain real-time and continuity characteristics of motion pictures. For example, if interpolation computation is performed when the LUT of the correction curve used for image correction is made, computation time affects a total processing speed, and a large processing delay may occur.

Thus, in the present exemplary embodiment, after the histogram of the input image RGB_IN is created, the image statistic is calculated, and the correction amount is calculated, real-time correction is achieved by directly performing correction processing on the continuously input frame data without performing the interpolation computation and LUT creation. Also, since the histogram and the correction amount are obtained from frame data of a previous frame, the next frame will be corrected based on the frame data of the previous frame. In other words, a frame based on which the correction amount is calculated and a frame that is to be corrected based on the calculated correction amount are delayed by one frame. However, such a delay does not visually affect motion pictures having a predetermined frame rate, for example, of more than thirty frames/second.

Furthermore, a detailed conversion method between the RGB data and the YUV data is not specially limited. But in order to perform at a high speed and to have a simple configuration (saving resources), a conversion method, in which small coefficients are used and the conversion is performed by the product sum operation and shift operation (removal of lower bits in terms of the circuit), may be used. Also, if the image input RGB_IN is not RGB data but YUV data, this conversion is unnecessary. In addition, the application of the present invention is not limited to the RGB data and the YUV data.

Next, the correction processing in the Y correction processing unit 240 will be described in detail. In the present exemplary embodiment, the correction performed by the Y correction processing unit 240 will be described as general curve correction that corrects multi-grayscale data using a correction curve regardless of the kind of correction, such as contrast correction, brightness correction, chroma correction, and the like.

Specifically, correction points that specify the correction curve are determined as follows. The correction points indicate points on the correction curve and are referred to determine the correction curve:

(1) The number of correction points is 1 or more.

(2) Input coordinates (the X-axis of a correction feature) of the correction points are previously fixed (i.e., there is no concern with the contents of images).

(3) Output coordinates (the Y-axis of the correction feature) of the correction points change in turn according to the contents of the images.

For example, if the input coordinates are $X1, X2, \ldots, Xn$ and the correction amount obtained from the contents of images are $\Delta Y1, \Delta Y2, \ldots, \Delta Yn$, the coordinates of the correction points are $(X1, X1+\Delta Y1), (X2, X2+\Delta Y2), \ldots, (Xn, Xn+\Delta Yn)$. If these correction points and fixed points (i.e., the minimum grayscale values and the maximum grayscale values) are grouped by a general spool line interpolation algorithm, the following correction curve equation is obtained:

If $0 \leq X < X1$, $$Y = F11[X] \times \Delta Y1 + F12[X] \times \Delta Y2 + \ldots + F1n[X] \times \Delta Yn + X$$

If $X1 \leq X < X2$, $$Y = F21[X] \times \Delta Y1 + F22[X] \times \Delta Y2 + \ldots + F2n[X] \times \Delta Yn + X$$

If $Xn \leq X$, $$Y = Fn1[X] \times \Delta Y1 + Fn2[X] \times \Delta Y2 + \ldots + Fnn[X] \times \Delta Yn + X$$

As a result, the following Equation is obtained:

$$Y = F1[X] \times \Delta Y1 + F2[X] \times \Delta Y2 + \ldots + Fn[X] \times \Delta Yn + X \quad \text{(Equation 1)}$$

Figure 4:
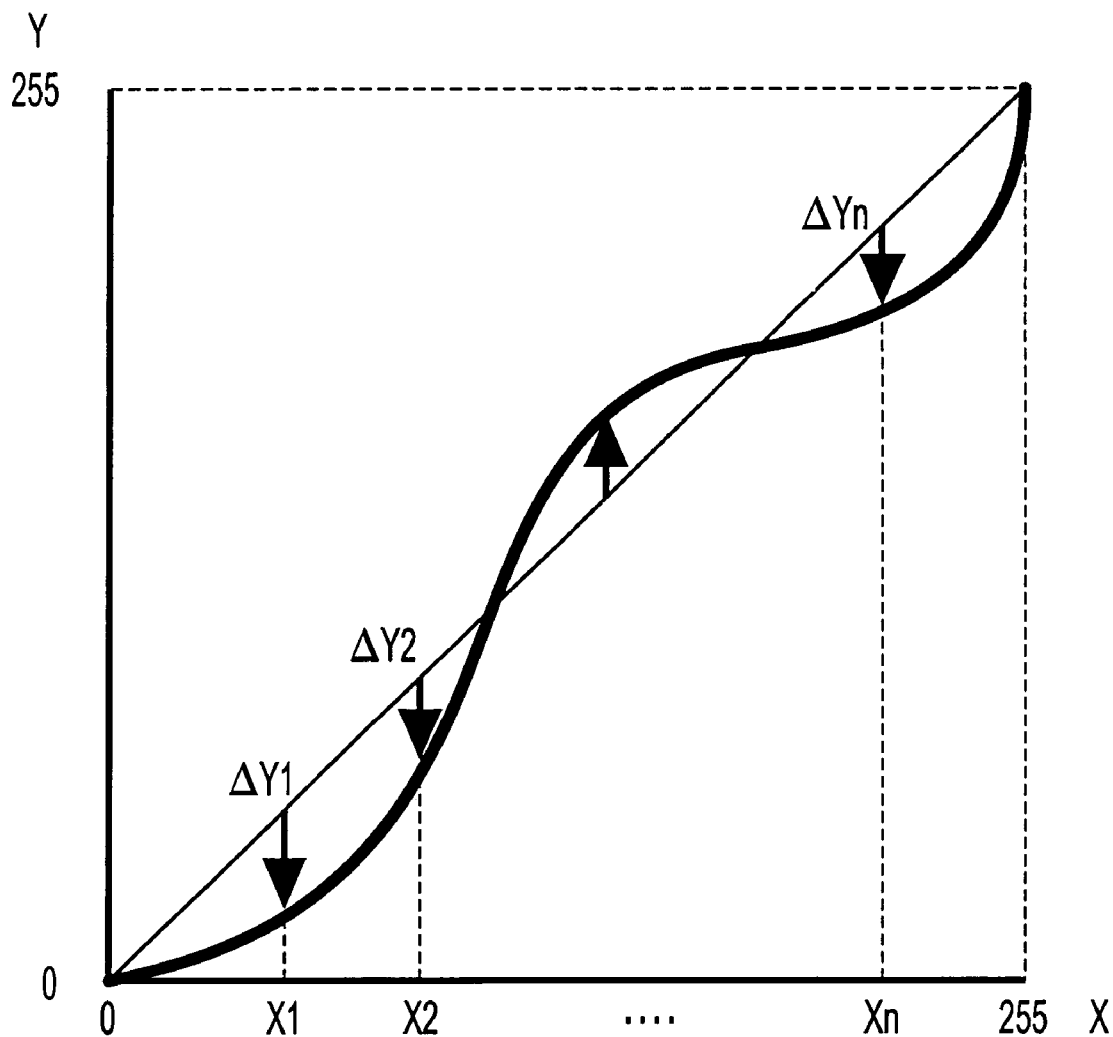
FIG. 4 illustrates an exemplary grayscale correction curve according to the first exemplary embodiment of the present invention.

Herein, since $F1[X], F2[X], \ldots, Fn[X]$, which are functions regarding X, are determined if $X1, X2, \ldots, Xn$ are determined, $F1[X], F2[X], \ldots, Fn[X]$ are previously calculated with respect to X ranging from the minimum grayscale to the maximum grayscale and are then arranged as a table. For example, if an input grayscale is 8 bits and a table value is 8 bits, the size of one table is 256×8 bits, and the grayscale correction characteristic, as shown in FIG. 4, is obtained.

Figure 5:
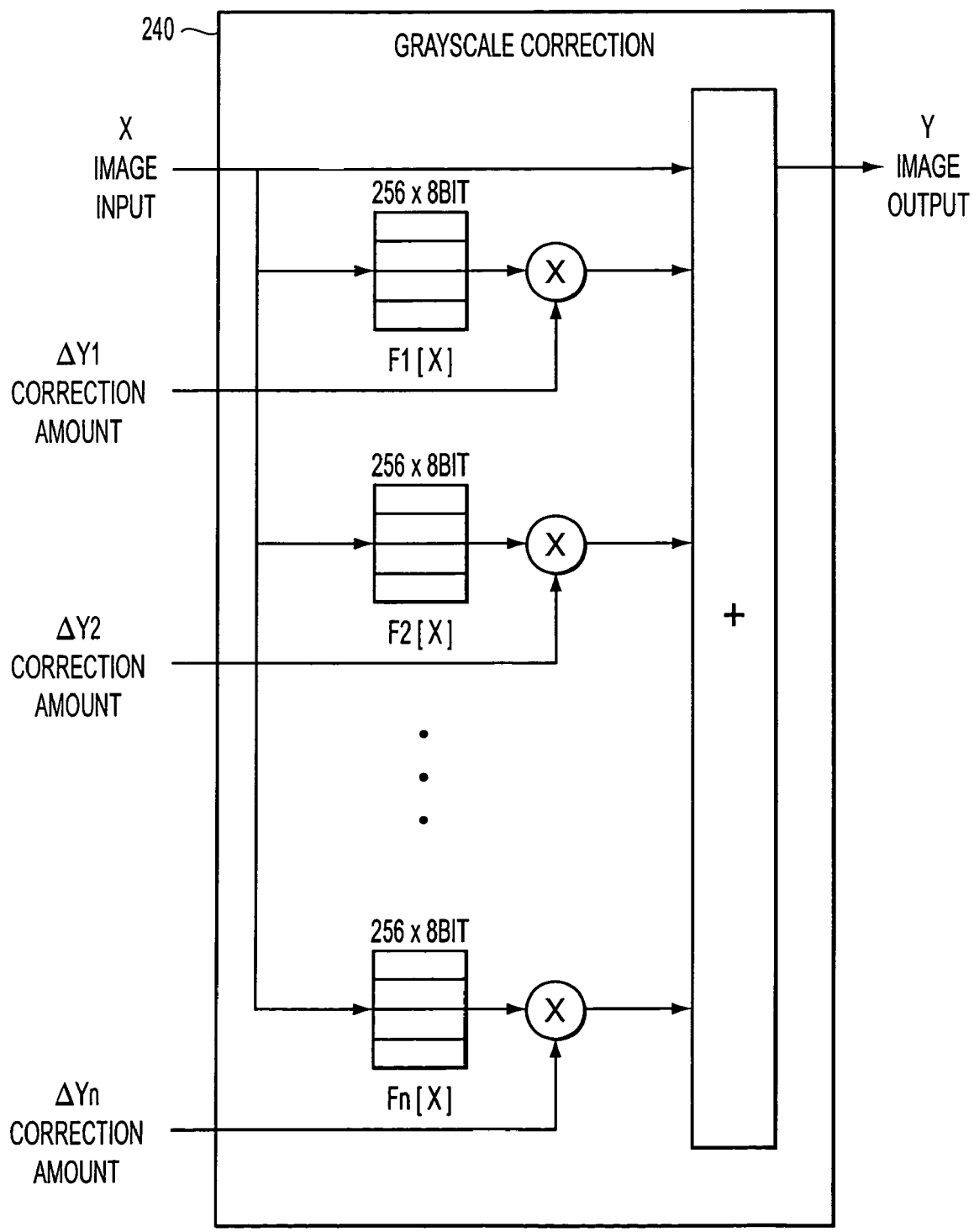
FIG. 5 is a schematic of the configuration of a correction amount calculating unit according to the first exemplary embodiment of the present invention.

Next, the basic configuration of the Y correction processing unit 240 according to the present exemplary embodiment will be described. FIG. 5 illustrates an exemplary configuration of the Y correction processing unit 240 according to the present exemplary embodiment. As shown in FIG. 5, an image input X and correction amounts $\Delta Y1$ to $\Delta Yn$ are input to the Y correction processing unit 240. The Y correction processing unit 240 has a table (in the present exemplary embodiment, 256×8 bits) corresponding to $F1[X]$ to $Fn[X]$ and adds the products of image input and coefficients $F1[X]$ to $Fn[X]$ to the correction amounts $\Delta Y1, \Delta Y2, \ldots, \Delta Yn$ according to Equation 1. Then, the Y correction processing unit 240 outputs the addition results as an image output Y.

Grayscale correction is performed according to the following procedure:

(1) First, the coefficients $F1[X], F2[X], \ldots, Fn[X]$ are previously calculated. These coefficients may be held as tables in ROM as shown in FIG. 5. Also, if a reduction in memory size is requested, the coefficients may be implemented as fixed values.

(2) Next, image inputting starts, the contents of a frame data are analyzed by the histogram creating unit 210 and the image statistic calculating unit 220, and the correction amounts $\Delta Y1$ to $\Delta Yn$ are determined by the correction amount calculating unit 230.

(3) Thereafter, the products of the correction amounts $\Delta Y1, \Delta Y2, \ldots, \Delta Yn$ and the coefficients $F1[X], F2[X], \ldots, Fn[X]$, which are determined depending on the image input X, are added to the image input X, and thus grayscale correction is performed. As such, instead of forming a spool line curve after the correction amounts $\Delta Y1, \Delta Y2, \ldots, \Delta Yn$ are determined, correction is performed only by the product sum operation using previously calculated values. Therefore, it is possible to perform high-speed correction processing.

As described above, according to the present exemplary embodiment, even if it is not free to use CPU for image display devices (e.g., if CPU cannot be used for image display because the CPU performs other processing, or if a processing speed is low or the CPU cannot be used at a timing required by a contrast correction circuit even though the CPU can be used), spool line interpolation is simply performed by a correction circuit itself described above. Thus, it is possible to correct and display motion pictures in real time. Also, since interpolation and correction can be performed on each pixel value of the input image in real time, it is not necessary to include an LUT memory for preserving interpolation results, thereby reducing the cost of an image display device itself.

Second Exemplary Embodiment

Hereinafter, a second exemplary embodiment of the present invention will be described. The second exemplary embodiment relates to an image processing system when image correction, more specifically contrast correction, is performed using a correction curve. Here, contrast correction is directed to enhancing contrast by decreasing a grayscale value of a pixel having low luminance and by increasing a grayscale value of a pixel having high luminance with respect to the Y (luminance) data of the input image.

Figure 6:
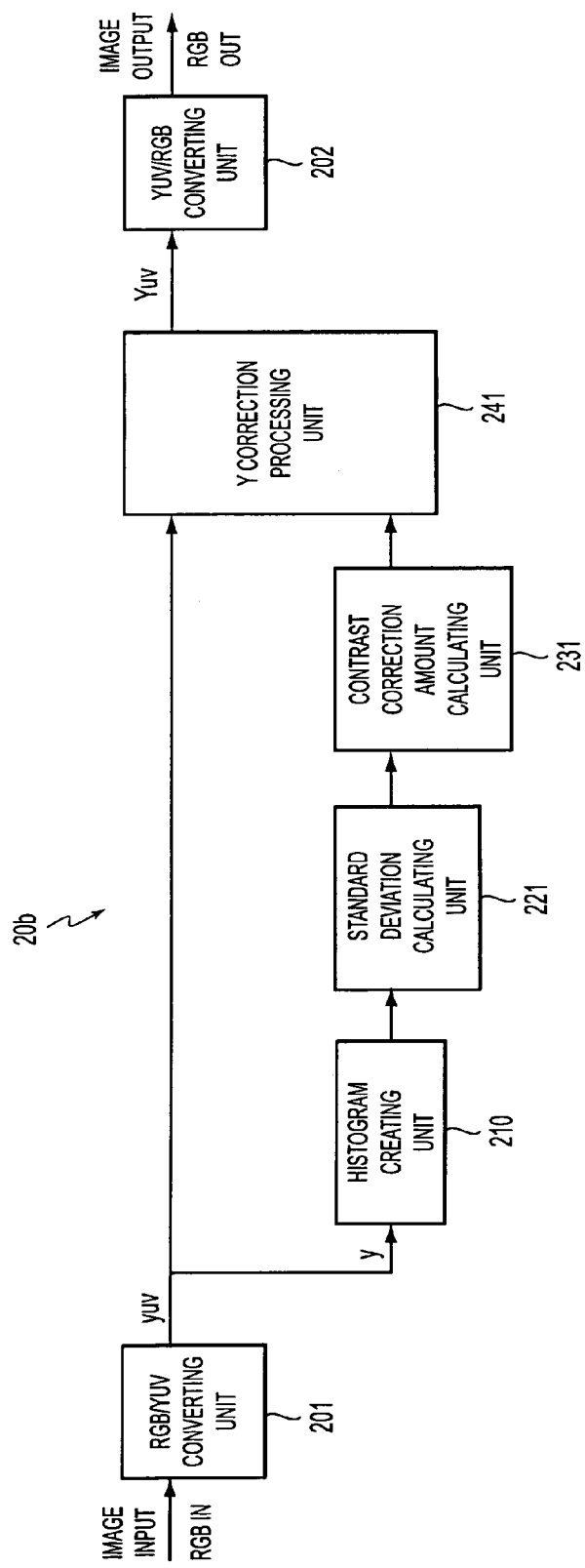
FIG. 6 is a schematic of the configuration of an image processor according to a second exemplary embodiment of the present invention.

FIG. 6 illustrates an exemplary configuration of an image processor 20b according to the second exemplary embodiment of the present invention. The basic configuration of the image processor 20b according to the second exemplary embodiment of the present invention is similar to that of the image processor 20a according to the first exemplary embodiment shown in FIG. 3. However, the image processor 20b is different from the image processor 20a in that a standard deviation calculating unit 221 instead of the image statistic calculating unit 220 is provided, a contrast correction amount calculating unit 231 instead of the correction amount calculating unit 230 is provided, and the Y correction processing unit 241 performs contrast correction.

In FIG. 6, an image input RGB_IN from the image input device 10 is converted into YUV data by the RGB/YUV converting unit 201. The Y data is transmitted to the histogram creating unit 210, a histogram of luminance is created in a frame unit, and the created histogram is supplied to the standard deviation calculating unit 221. The standard deviation calculating unit 221 calculates a standard deviation of luminance in frame unit and supplies the calculated standard deviation to the contrast correction amount calculating unit 231. The contrast correction amount calculating unit 231 calculates a contrast correction amount based on the calculated standard deviation and supplies the contrast correction amount to the Y correction processing unit 241. The Y correction processing unit 241 performs contrast correction of the Y data according to the received correction amount. The Y data, U data, and V data subjected to the contrast correction are converted into the image output RGB_OUT, which is RGB data, by the YUV/RGB converting unit 202, and the image output RGB_OUT is output to the image output device 30.

Figure 7A:
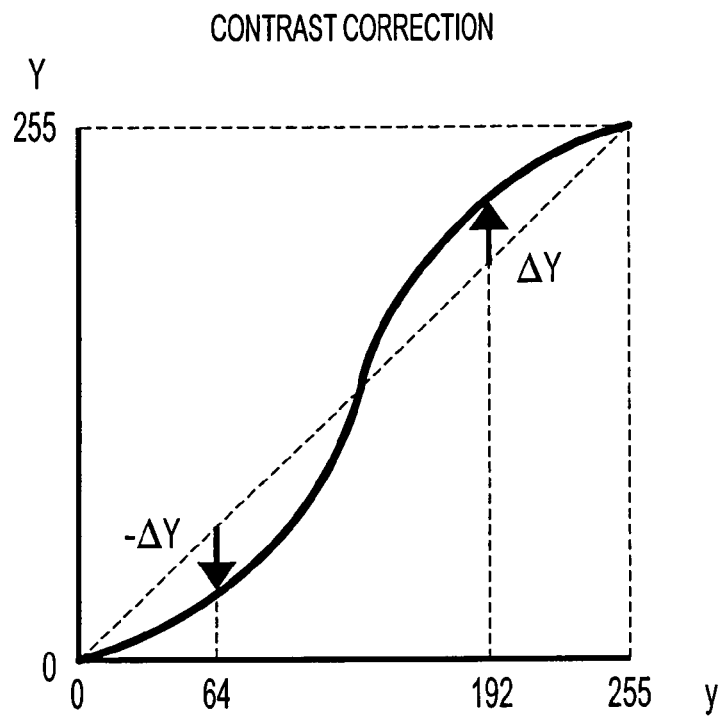
FIGS. 7a and 7b illustrate an exemplary contrast correction curve according to the second exemplary embodiment of the present invention.

Next, correction processing in the Y correction processing unit 241 will be described in detail. In this exemplary embodiment, as image correction, contrast correction is performed. Thus, correction points that specify a correction curve are determined as follows (see FIG. 7a):

(1) The number of correction points is 2.

(2) Input coordinates (the X-axis of a correction characteristic) of the correction points are set to 64 (=256×¼) and 192 (=256×¾).

(3) Output coordinates (the Y-axis of the correction characteristic) of the correction points have a grayscale decreased by an absolute value of the correction amount when the input coordinate is 64 and have a grayscale increased by the absolute value of the correction amount when the input coordinate is 192.

If the absolute value of the correction amount is $\Delta Y$, correction point coordinates are $(64, 64-\Delta Y)$ and $(192, 192+\Delta Y)$.

The contrast correction amount $\Delta Y$ is, for example, determined as follows. Let a luminance standard deviation of a frame pixel be $\sigma$ and the maximum luminance standard deviation for contrast correction be $\sigma limit$. Then, the following correction amount $\Delta Y$ is obtained:

$\Delta Y = \sigma limit - \sigma (\sigma < \sigma limit)$ $\Delta Y = 0 (\sigma \geq \sigma limit)$ However, the above description is only an example of the correction amount determination and is intended to explain that the correction amount is adaptively determined from parameters that change according to the contents of an image. Therefore, correction amount determination in the present invention is not limited to the above example.

If a fixed point (0, 0), correction points $(64, 64-\Delta Y)$ and $(192, 192+\Delta Y)$, and a fixed point (255, 255) are grouped as a spool line interpolation algorithm, input luminance y and output luminance Y have the following relationship:

If $0 \leq y < 64$, $Y = y(y^2 - 12288)/2^{19} \times \Delta Y + y$

Figure 7B:
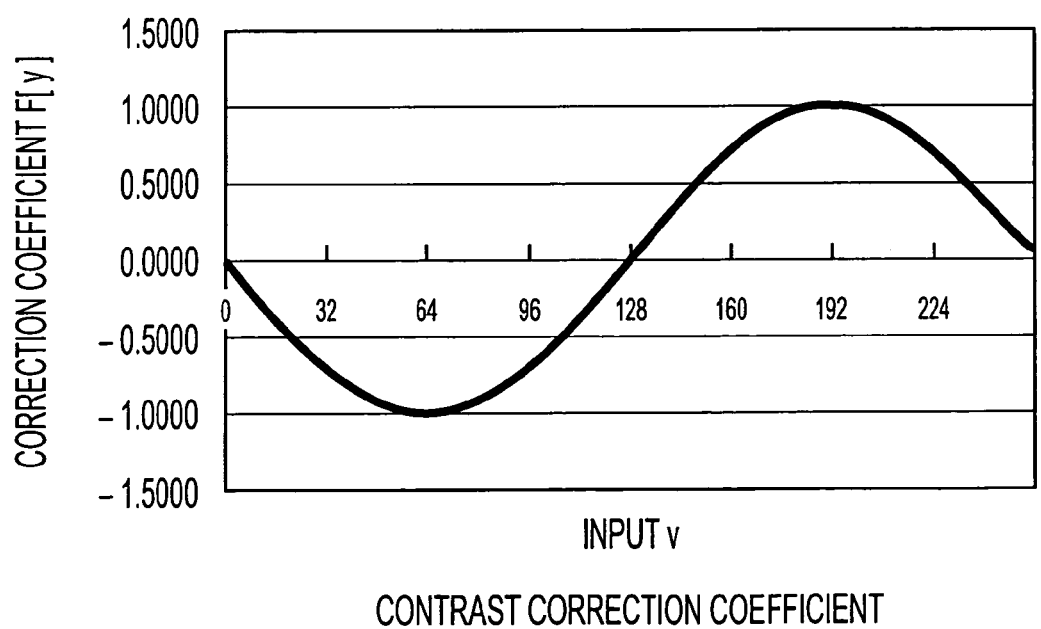

If $64 \leq y < 192$, $Y = y'(y'^2 - 12288)/2^{19} \times \Delta Y + y$, wherein $y' = 128 - y$ If $192 \leq y \leq 255$, $Y = y''(y''^2 - 12288)/2^{19} \times \Delta Y + y$, wherein $y'' = y - 256$ Let this relationship be $Y = F[y] \times \Delta Y + y$; then, the coefficient $F[y]$ of the correction amount $\Delta Y$ is as shown in FIG. 7b. As shown in FIG. 7b, $F[y]$ is a waveform having periodicity similar to a sine wave. Thus, assuming that a portion of $128 \leq y \leq 192$ is a basic curve pattern, only coefficients corresponding to the portion are tabulated and stored.

Contrast correction is performed by the Y correction processing unit 241 as follows:

(1) The coefficient $F[y]$ is previously calculated. However, a portion of the curve pattern corresponding to the section $128 \leq y \leq 192$ is defined as $F'[Z]$ ($0 \leq z \leq 64$) again. $F'[Z]$ may be tabulated based on a fixed decimal point number of a bit length (e.g., 8 bits) and held in a ROM, or the same value as a fixed value stored in the ROM may be implemented to a circuit for memory reduction.

(2) Once image input starts, the histogram creating unit 210 creates a histogram, the standard deviation calculating unit 221 calculates a standard deviation, and the contrast correction amount calculating unit 231 determines the correction amount $\Delta Y$.

Figure 8:
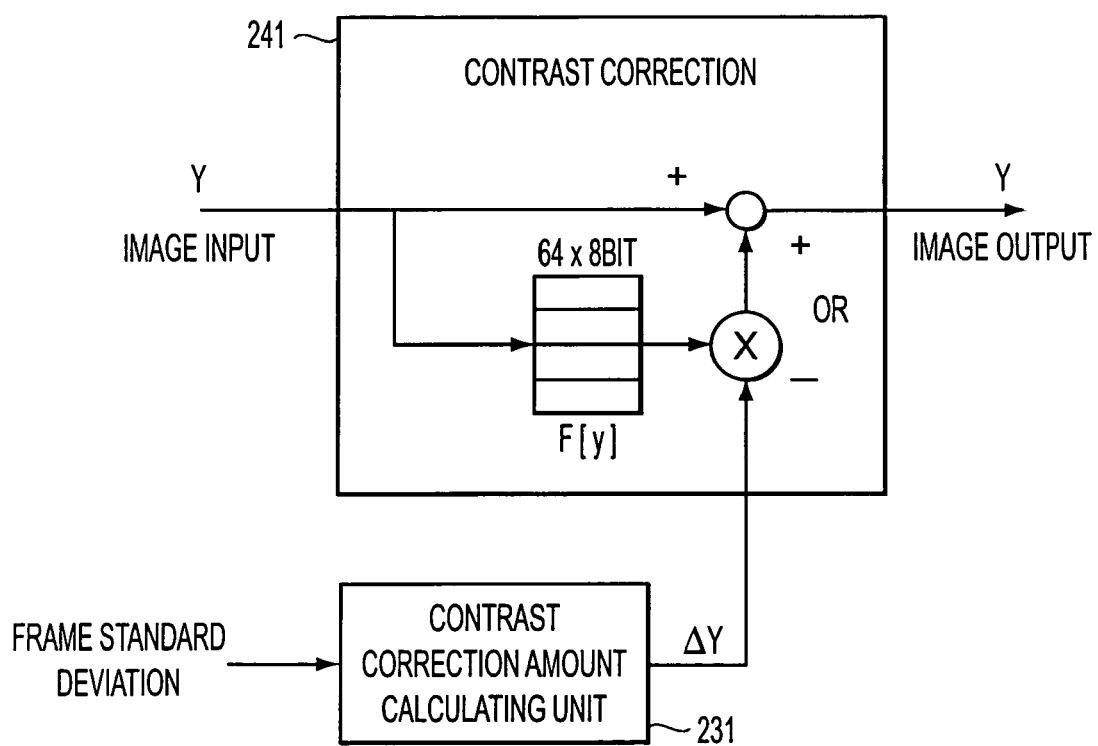
FIG. 8 is a schematic of the configuration of a Y correction processing unit according to the second exemplary embodiment of the present invention.

(3) Contrast correction is performed by adding the product of $\Delta Y$ and $F[y]$, which is determined by input data y, to the original data y. FIG. 8 illustrates an exemplary configuration of the Y correction processing unit 241 which performs contrast correction. The Contrast correction is performed by the illustrated circuit.

However, the Y correction processing unit 241 performs computation as follows:

If $0 \leq y < 64$, then $F[y] = -F'[y]$

If $64 \leq y < 128$, then $F[y] = -F'[128-y]$

If $128 \leq y < 192$, then $F[y] = F'[y-128]$

If $192 \leq y \leq 255$, then $F[y] = F'[256-y]$

As described above, instead of creating a spool line curve after the correction amount $\Delta Y$ is determined, correction is performed by only the product sum operation using a predetermined value, which makes it possible to perform high-speed correction processing. Also, since only a portion of the correction curve can be stored using the periodicity of the correction curve and be used (i.e., the correction curve is regarded as a combination of specific curve patterns, and only coefficients that correspond to the curve pattern are stored), the size of a coefficient table or the size of a coefficient memory circuit can be reduced.

Third Exemplary Embodiment

Hereinafter, a third exemplary embodiment of the present invention will be described. The third exemplary embodiment relates to an image processing system in which image correction, particularly, brightness correction using a correction curve is performed. Brightness correction is performed when the entire luminance distribution of Y (luminance) data of an input image inclines toward low luminance or high luminance.

Figure 9:
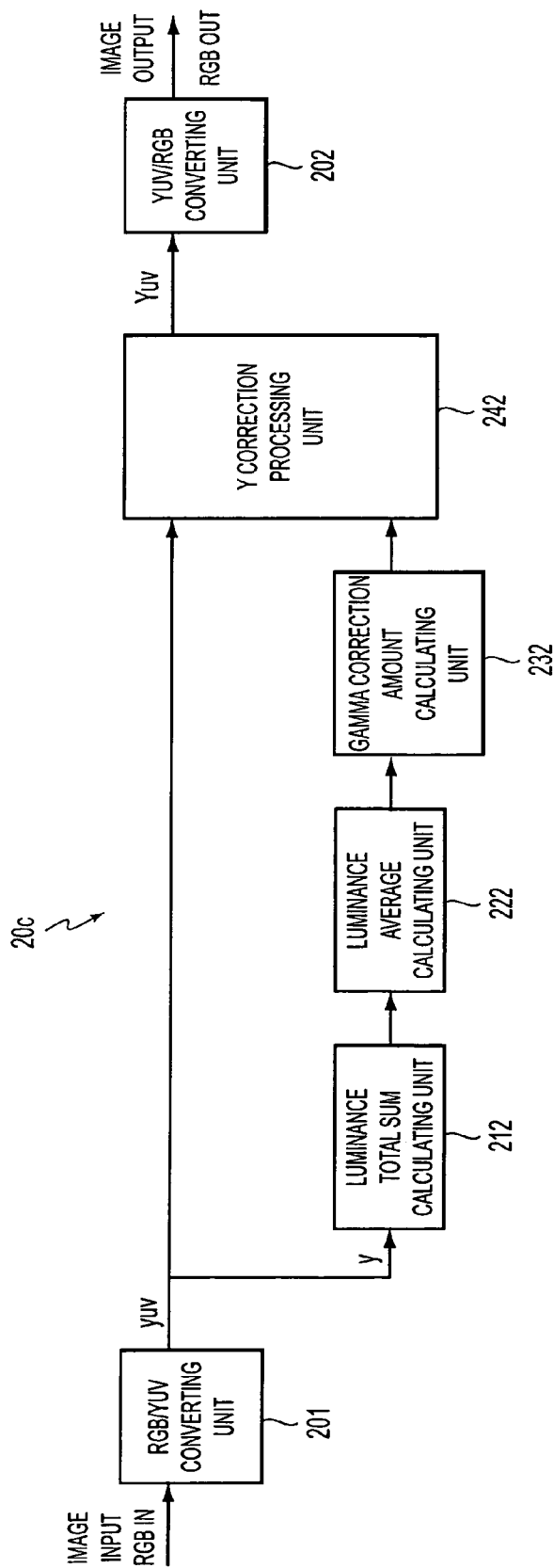
FIG. 9 is a schematic of the configuration of an image processor according to a third exemplary embodiment of the present invention.

FIG. 9 illustrates the configuration of an image processor 20c according to the third exemplary embodiment of the present invention. The basic configuration of the image processor 20c according to the third exemplary embodiment is similar to that of the image processor 20a according to the first exemplary embodiment shown in FIG. 3. Specifically, the image processor 20c includes an RGB/YUV converting unit 201, a luminance total sum calculating unit 212, a luminance average calculating unit 222, a brightness correction amount calculating unit 232, a Y correction processing unit 242, and a YUV/RGB converting unit 202.

In FIG. 9, an image input RGB_IN from the image input device 10 is converted into YUV data by the RGB/YUV converting unit 201. Y data is transmitted to the luminance total sum calculating unit 212, the total sum of luminance is calculated in a frame unit. Then the calculated value is supplied to the luminance average calculating unit 222. The luminance average calculating unit 222 calculates the average of luminance in a frame unit and supplies the calculated average to the brightness correction amount calculating unit 232. The brightness correction amount calculating unit 232 calculates the brightness correction amount based on the calculated average and supplies the calculated brightness correction amount to the Y correction processing unit 242. The Y correction processing unit 242 performs brightness correction of the Y data according to the received correction amount. Also, Y data, U data, and V data after brightness correction is performed are converted into the image output RGB_OUT, which is RGB data, by the YUV/RGB converting unit 202, and the image output RGB_OUT is output to the image output device 30.

Figure 10A:
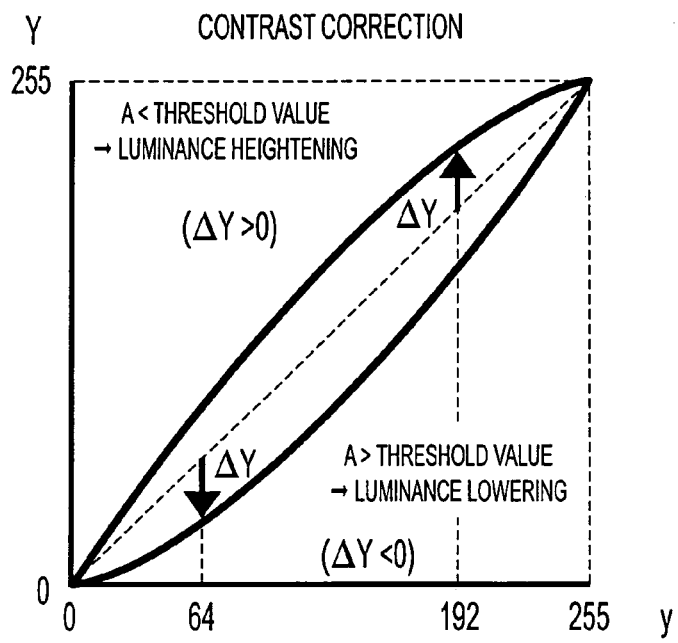
FIGS. 10a and 10b illustrate an exemplary chroma correction curve according to the third exemplary embodiment of the present invention.

Next, correction processing in the Y correction processing unit 242 will be described in detail. In the present exemplary embodiment, image correction is performed as brightness correction, and correction points that specify a correction curve are defined as follows (see FIG. 10a):

(1) The number of correction point is one.

(2) Input coordinates (the X-axis of a correction characteristic) of the correction point is set to 64 when correction amount is below 0 and is set to 192 when correction amount is above 0 (an example of a symmetry value with respect to an input coordinate value 128).

(3) Output coordinates (the Y-axis of the correction characteristic) of the correction point have a decreased grayscale when the input coordinate value is 64 and have an increased grayscale when the input coordinate value is 192.

If an absolute value of the correction amount is $\Delta Y$, the coordinate value of the correction point is either $(64, 64-\Delta Y)$ or $(192, 192+\Delta Y)$.

For example, the brightness correction amount $\Delta Y$ can be determined as follows. Let the luminance average of an input frame image be A and a threshold, by which either an increase in luminance of the input frame image or a decrease in luminance thereof is determined, be Ath. Then, the following correction amount $\Delta Y$ is obtained:

$$\Delta Y = Ath - A$$

Also, the above is an example of a method of determining the brightness correction amount, and other methods of determining correction amount may be employed.

When $\Delta Y > 0$ if a fixed point $(0,0)$, a correction point $(192, 192+\Delta Y)$, and a fixed point $(255, 255)$ are grouped by a spool line interpolation algorithm, the relationship between input luminance y and output luminance Y is as follows:

If $0 \leq y < 192$, $$Y = -y(y^2 - 61440)/(9 \times 2^{19}) \times \Delta Y + y$$

If $192 \leq y \leq 255$, $$Y = -y'(y'^2 - 28672)/(3 \times 2^{19}) \times \Delta Y + y, \text{ wherein } y' = 256 - y$$

When $\Delta Y < 0$, if a fixed point $(0,0)$, a correction point $(64, 64+\Delta Y)$, and a fixed point $(255, 255)$ are grouped by the spool line interpolation algorithm, the relationship between input luminance y and output luminance Y is as follows:

If $0 \leq y < 64$, $$Y = -y(y^2 - 28672)/(3 \times 2^{19}) \times \Delta Y + y$$

If $64 \leq y < 255$, $$Y = -y'(y'^2 - 61440)/(9 \times 2^{19}) \times \Delta Y + y, \text{ wherein } y' = 256 - y$$

Figure 10B:
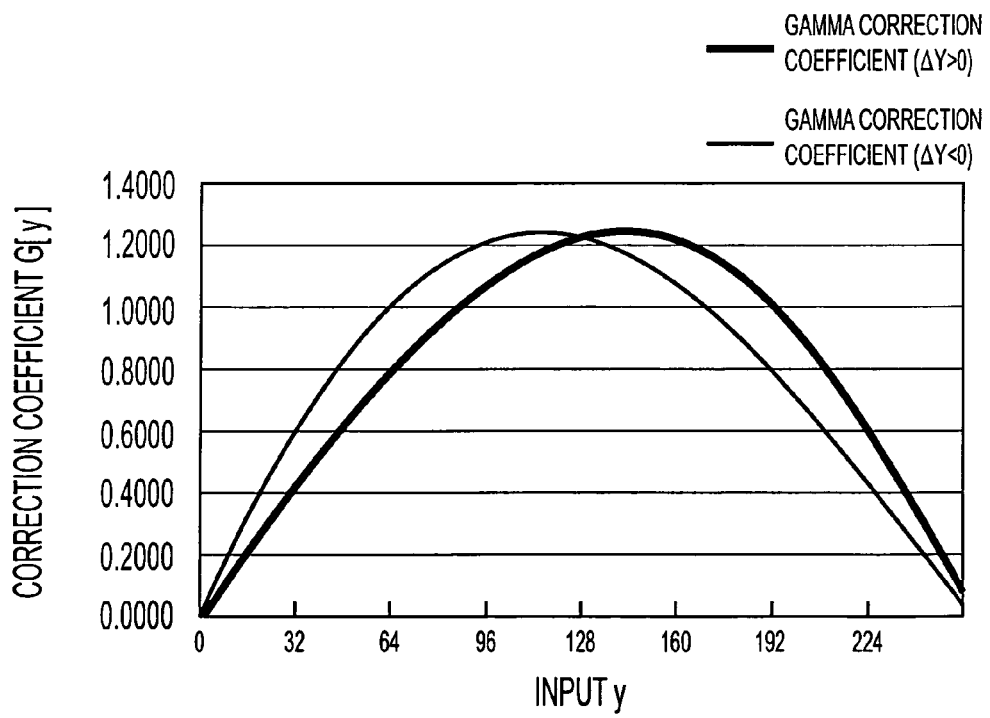

If the above relationship is rearranged as $Y = G[y] \times \Delta Y + y$, a coefficient $G[y]$ of the correction amount $\Delta Y$ is as shown in FIG. 10b. As shown in FIG. 10b, $G[y]$ has a waveform that is symmetric with respect to 128 when $\Delta Y > 0$ and $\Delta Y < 0$. Thus, it is preferable to tabulate and store data only if $\Delta Y > 0$.

Brightness correction processing is performed by the Y correction processing unit 242 as follows:

(1) The coefficient $G[y]$ when $\Delta Y > 0$ is previously calculated. $G[y]$ is a fixed decimal point number of a bit length (e.g., 8 bits) and may be tabulated and held in a ROM, or a circuit may be implemented such that the coefficient $G[y]$ is output as a fixed value for memory reduction.

(2) Once image inputting starts, the luminance total sum calculating unit 212 calculates the total sum of luminance in a frame unit, the luminance average calculating unit 222 calculates the average of luminance, and the brightness correction amount calculating unit 232 determines the correction amount $\Delta Y$.

(3) Brightness correction is performed by adding the product of $\Delta Y$ and $G[y]$ when $\Delta Y > 0$ or the product of $\Delta Y$ and $G[255-y]$ when $\Delta Y < 0$ to the original data y. In addition, when $\Delta Y < 0$, the product of $\Delta Y$ and $G[255-y]$ may be subtracted from the original data y.

Also, if the input y of the correction point is 128, a brightness correction curve has a symmetric waveform similar to that of a sine wave as in the second exemplary embodiment. Thus, only the section ranging 0 through 128 (only a half portion of the brightness correction coefficient shown in FIG. 10b) is tabulated, resulting in memory reduction.

Fourth Exemplary Embodiment

Next, a fourth exemplary embodiment of the present invention will be described. The fourth exemplary embodiment relates to an image processing system in which image correction, more particularly, chroma correction (chroma emphasis) using a correction curve is performed.

Figure 11:
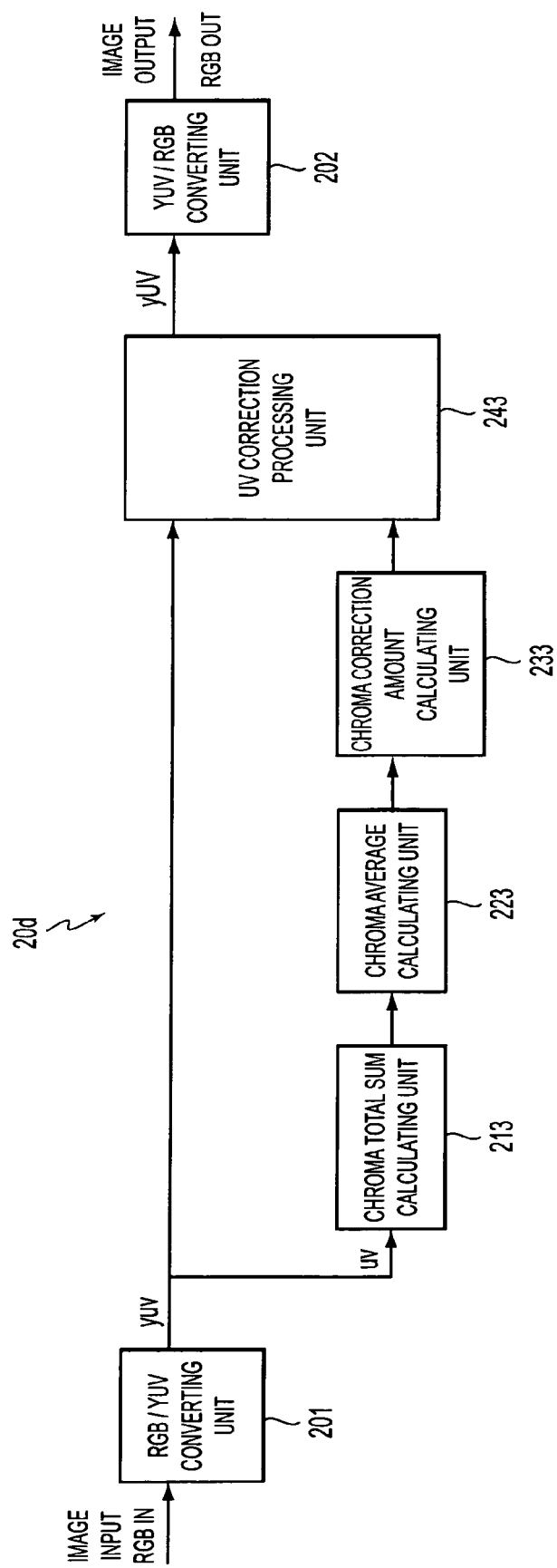
FIG. 11 is a schematic of the configuration of an image processor according to a fourth exemplary embodiment of the present invention.

FIG. 11 illustrates the configuration of an image processor 20d according to the fourth exemplary embodiment of the present invention. The basic configuration of the image processor 20d according to the fourth exemplary embodiment is similar to that of the image processor 20a according to the first exemplary embodiment shown in FIG. 3. Specifically, the image processor 20d includes an RGB/YUV converting unit 201, a chroma total sum calculating unit 231, a chroma average calculating unit 223, a chroma correction amount calculating unit 223, a UV correction processing unit 243, and a YUV/RGB converting unit 202.

In FIG. 11, the image input RGB_IN from the image input device 10 is converted into YUV data by the RGB/YUV converting unit 201. U data and V data are supplied to the chroma total sum calculating unit 213. The total sum of chroma is calculated in a frame unit. The calculated total sum is supplied to the chroma average calculating unit 223. The chroma average calculating unit 223 calculates the average of chroma in a frame unit and supplies the calculated average to the chroma correction amount calculating unit 233. The chroma correction amount calculating unit 233 calculates the chroma correction amount based on the calculated average of chroma and supplies the calculated chroma correction amount to the UV correction processing unit 243. The UV correction processing unit 243 performs chroma correction of UV data according to the received correction amount. Then, U data and V data, which are subjected to chroma correction, and Y data are converted into the image output RGB_OUT, which is RGB data, by the YUV/RGB converting unit 202, and the image output RGB_OUT is output to the image output device 30.

As can be seen from RGB/YUV conversion equation described above, U and V can take negative values and range from −128 to +128. U and V values can be treated as two's complements. However, for the purpose of simplification, U and V values are converted into values ranging 0 to 255 obtained by adding 128 to the U and V values, and then correction processing is performed thereon. Then, 128 is subtracted from the U and V values when YUV data is converted into RGB data. Such processing can be implemented by inverting the most significant bit that indicates polarities of the U and V values.

Thereafter, chroma correction is performed on the values u+128 and v+128 that range from 0 to 255. Since processing on u+128 and processing on v+128 are the same, only processing on u+128 will be described here.

Figure 12A:
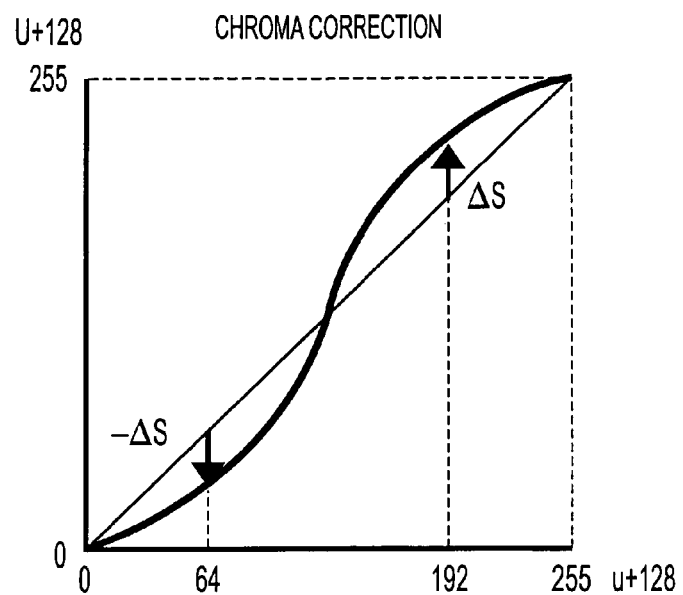
FIGS. 12a and 12b illustrates an exemplary chroma correction curve according to the fourth exemplary embodiment of the present invention.
Figure 12B:
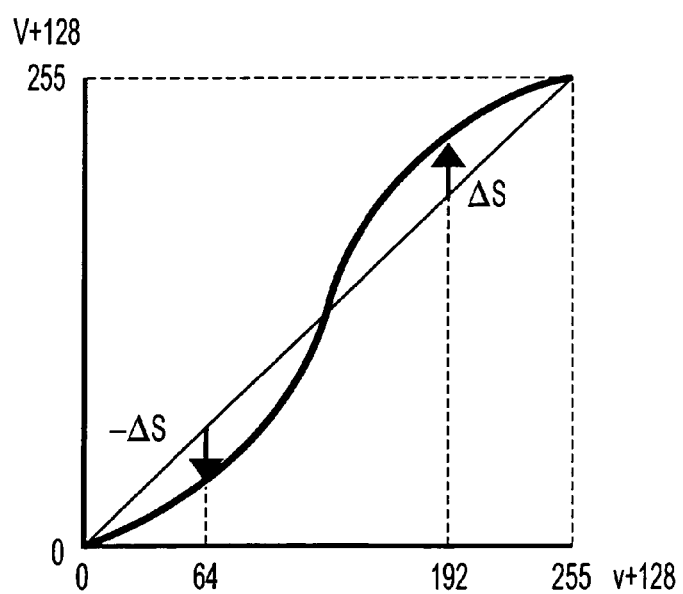

Hereinafter, correction processing in the UV correction processing unit 243 will be described in detail. In the present exemplary embodiment, chroma correction is performed as image correction, and correction points that specify a correction curve are defined as follows (see FIGS. 12a and 12b):

(1) The number of correction points is two.

(2) Input coordinates (the X-axis of a correction characteristic) of the correction points are set to 64 (=256×¼) and 192 (=256×¾).

(3) Output coordinates (the Y-axis of the correction characteristic) of the correction points have a grayscale decreased by an absolute value of the correction amount when the input coordinate value is 64 and have a grayscale increased by the absolute value of the correction amount when the input coordinate value is 192.

If an absolute value of the correction amount is $\Delta S$, the coordinates of the correction points are $(64, 64-\Delta S)$ and $(192, 192+\Delta S)$.

The chroma correction amount $\Delta S$ can be determined as follows. Let chroma S be $S=(|u|+|v|)/2$. Let the average of luminance of a frame image be Sa. Let the upper limit of the average of luminance Sa for chroma correction be Slimit. Then, the following chroma correction amount $\Delta S$ is obtained:

$$\Delta S = Slimit - Sa \ (Sa < Slimit)$$

$$\Delta S = 0 \ (Sa > Slimit)$$

Also, such a method of determining the chroma correction amount is exemplary, and other methods of determining the correction amount may be employed.

Chroma correction with respect to U and V is performed by the UV correction processing unit 243 in the same way as the contrast correction with respect to Y.

(1) The coefficient F[y] is previously calculated.

(2) Once image inputting starts, the chroma total sum calculating unit 213 calculates the total sum of chroma. The chroma average calculating unit 223 calculates the average of luminance. The luminance correction amount calculating unit 233 determines the correction amount $\Delta S$.

Figure 13:
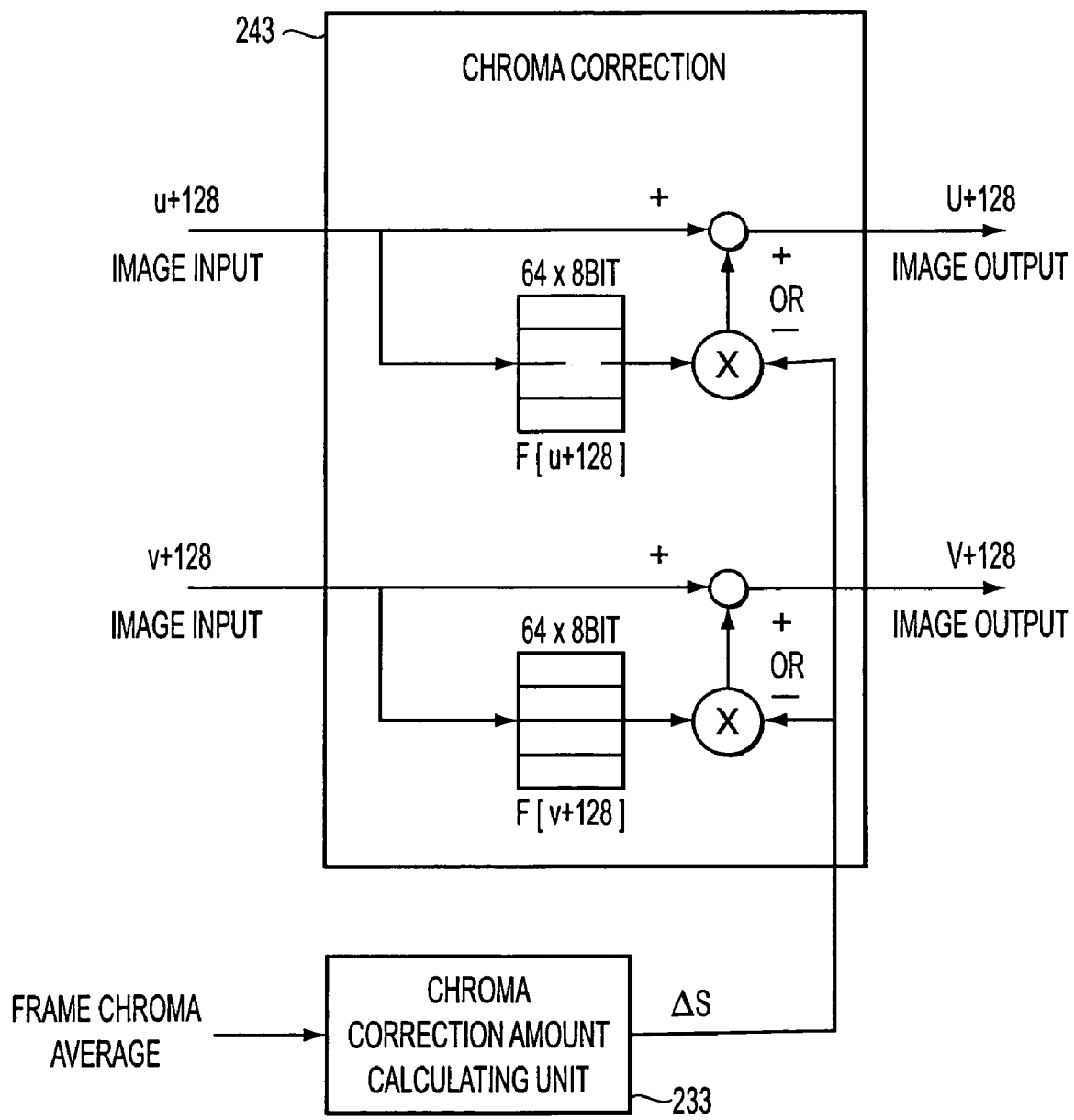
FIG. 13 is a schematic of the configuration of a UV correction processing unit according to the fourth exemplary embodiment of the present invention.

(3) Chroma correction is performed by adding the product of $\Delta S$ and F[u+128], which is determined by the input u+128, to the original data y. The exemplary configuration of the UV correction processing unit 243 that performs chroma correction is shown in FIG. 13. Chroma correction is performed by the illustrated circuit.

In addition, since the input v+128 is processed in the same way as the input u+128, the UV correction processing unit 243 includes two circuits for the product sum operation, as shown in FIG. 13.

Fifth Exemplary Embodiment

Figure 14:
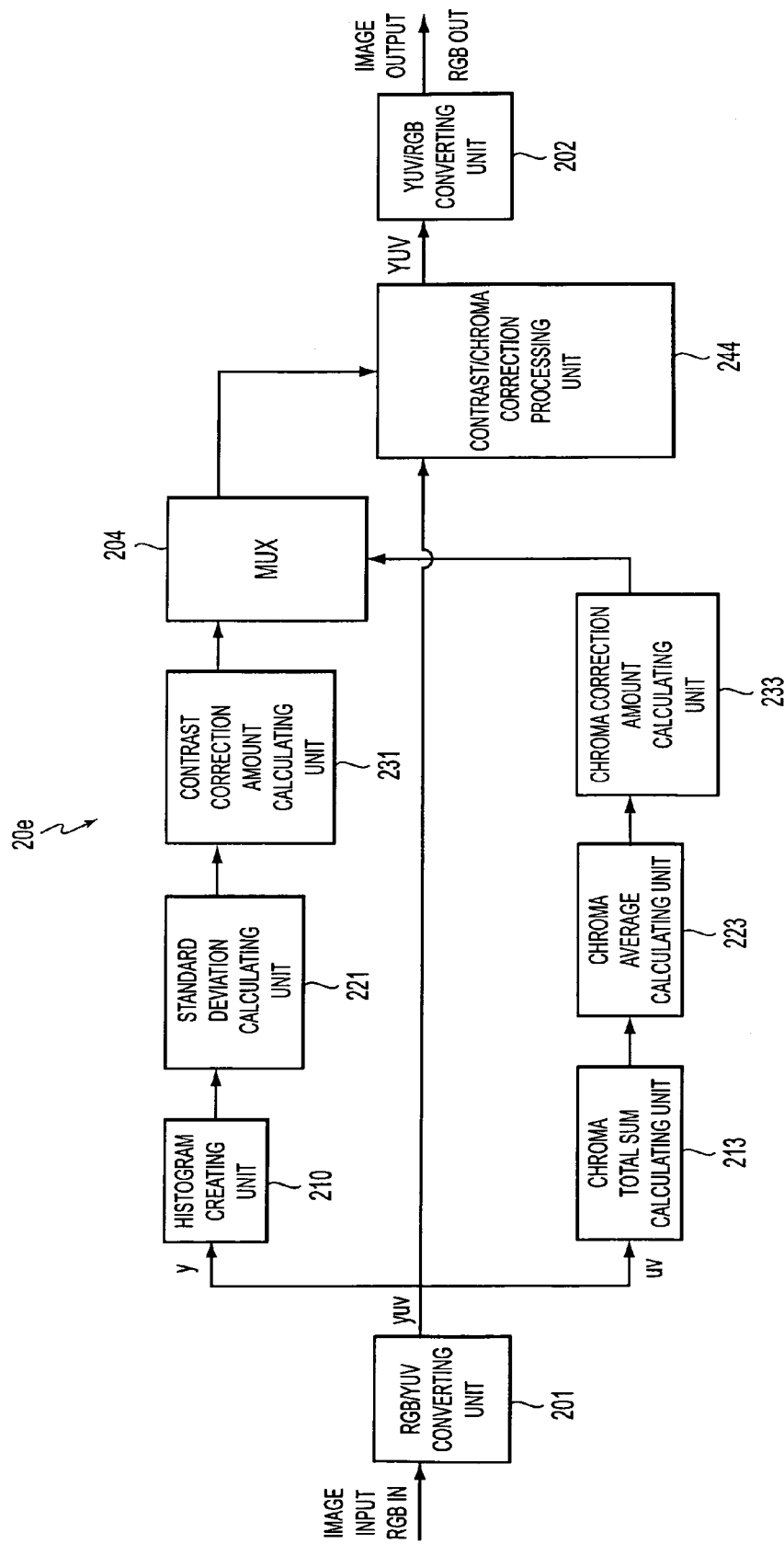
FIG. 14 is a schematic of the configuration of an image processor according to a fifth embodiment of the present invention.

Next, a fifth exemplary embodiment of the present invention will be described. The fifth exemplary embodiment relates to an image processing system in which both contrast correction and chroma correction are performed as image correction. FIG. 14 illustrates the configuration of an image processor 20e according to the fifth exemplary embodiment of the present invention. As shown in FIG. 14, the image processor 20e includes an RGB/YUV converting unit 201, a YUV/RGB converting unit 202, a histogram creating unit 210, a standard deviation calculating unit 221, a contrast correction amount calculating unit 231, a chroma total sum calculating unit 213, a chroma average calculating unit 223, a chroma correction amount calculating unit 233, a multiplexer 204, and a contrast/chroma correction processing unit 244.

In FIG. 14, the image input RGB_IN from the image input device 10 is converted into YUV data by the RGB/YUV converter 201. Each of Y, U, and V data is supplied to the contrast/chroma correction processing unit 244. At the same time, the Y data is supplied to the histogram creating unit 210, and the U data and Y data are supplied to the chroma total sum calculating unit 213.

Contrast correction and chroma correction are basically performed in the same way as the second and fourth exemplary embodiments, respectively. For the contrast correction, the histogram creating unit 210 creates a histogram of luminance for each frame, the standard deviation calculating unit 221 calculates the standard deviation thereof, and the contrast correction amount calculating unit 231 calculates a contrast correction amount based on the calculated standard deviation and provides the calculated contrast correction amount to the multiplexer 204. For the chroma correction, the chroma total sum calculating unit 213 calculates the total sum of luminance for every frame of each of the U data and V data. The chroma average calculating unit 223 calculates the average of chroma. The chroma correction amount calculating unit 233 calculates a chroma correction amount based on the calculated average and supplies the calculated chroma correction amount to the multiplexer 204.

The multiplexer 204 is provided to time-divisionally supply the contrast correction amount and the chroma correction amount to the contrast/chroma correction processing unit 244. The contrast/chroma correction processing unit 244 performs contrast correction on the Y data according to the contrast correction amount in the same way as the second exemplary embodiment. At the same time, the contrast/chroma correction processing unit 244 performs chroma correction on the U data and V data according to the chroma correction amount in the same way as the fourth exemplary embodiment and then supplies the Y, U, and V data subjected to the chroma correction to the YUV/RGB converting unit 202. The YUV/RGB converting unit 202 converts the received YUV data into RGB data and outputs the RGB data to the image output device 30 as the image output RGB_OUT.

Figure 15:
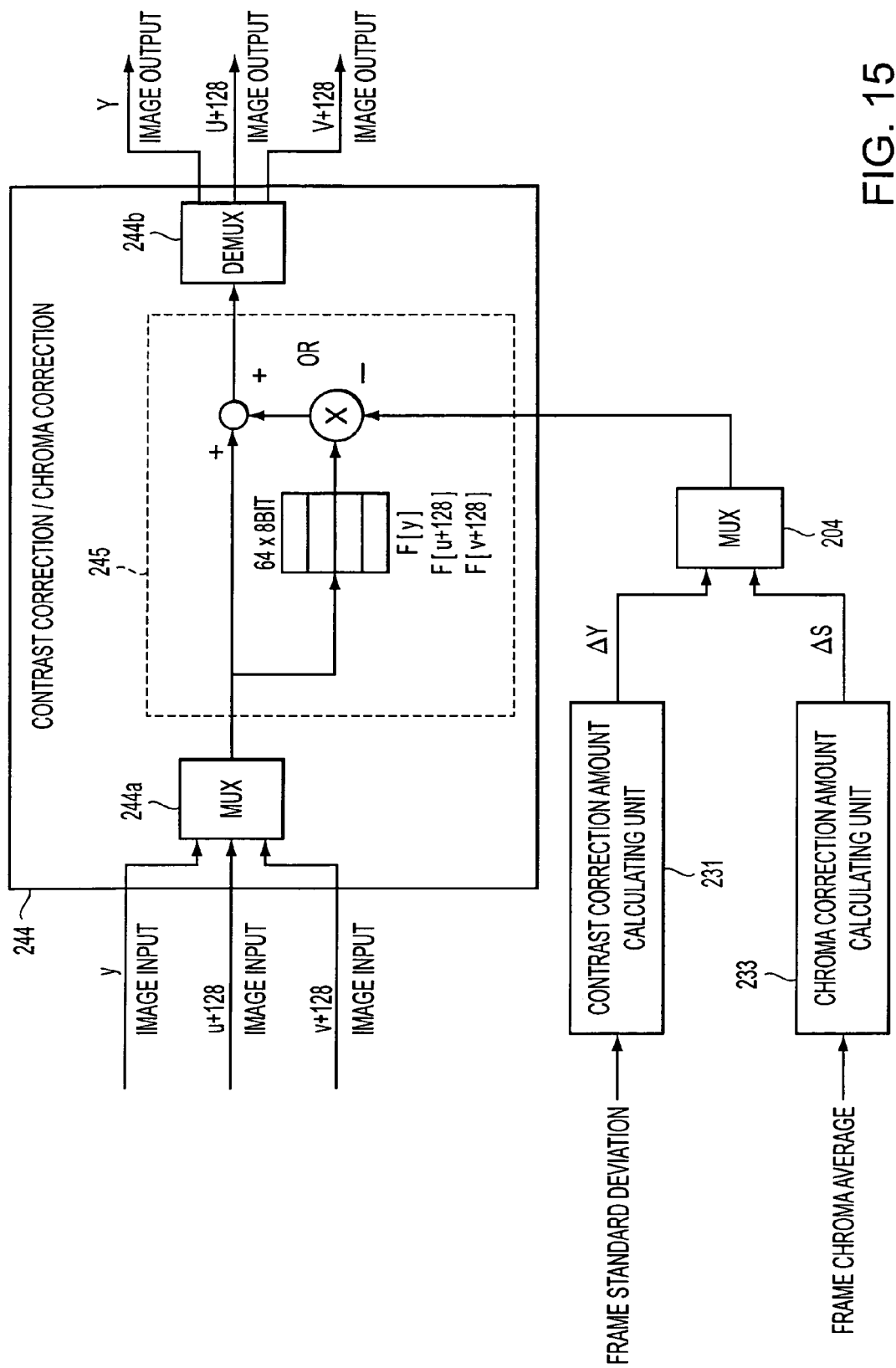
FIG. 15 is a schematic of the configuration of a contrast/chroma correction processing unit according to the fifth exemplary embodiment of the present invention.

FIG. 15 illustrates the detailed configuration of the contrast/chroma correction processing unit 244. A multiplexer 244a receives y, u+128, and v+128 as image input signals, time-divisionally selects one of them, and supplies the selected one to a correction block 245. The operations of the multiplexer 244a and the multiplexer 204 are synchronized with each other. Thus, when the multiplexer 244a selects the image input y, the multiplexer 204 selects the contrast correction amount ΔY. In addition, when the multiplexer 244a selects the image input u+128 or v+128, the multiplexer 204 selects the chroma correction amount ΔS.

The correction block 245 determines a coefficient F[ ] with reference to a table according to one of the given input data y, u+128, and v+128, adds the determined coefficient to the original data, and then supplies image data after correction to a demultiplexer 244b. The demultiplexer 244b time-divisionally provides an image output Y after contrast correction and image outputs U+128 and V+128 after chroma correction to the YUV/RGB converting unit 202.

Figure 16:
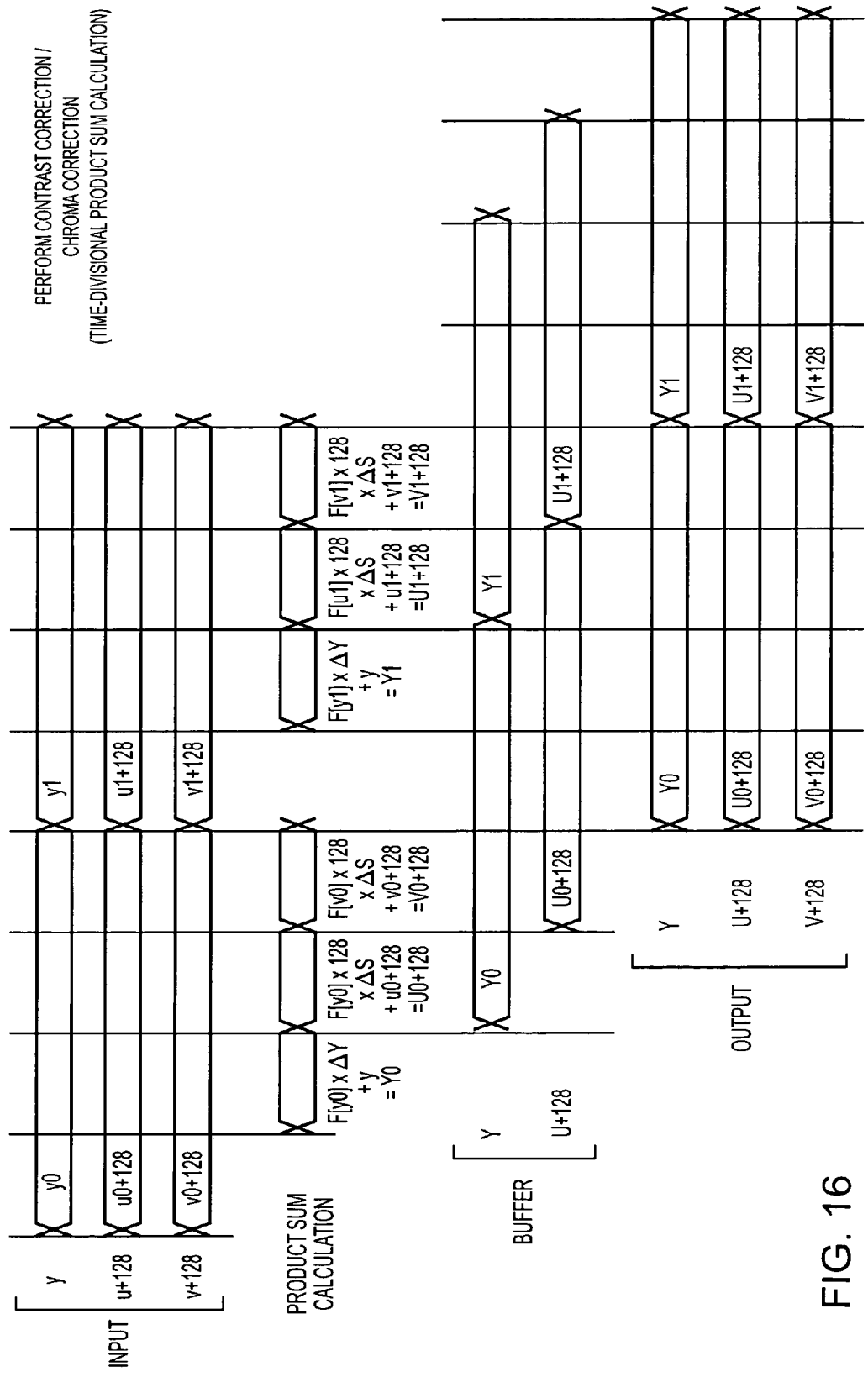
FIG. 16 is a timing chart for contrast/chroma correction processing.

FIG. 16 is a timing chart for an exemplary time-divisional process of the contrast correction and chroma correction performed by the image processor 20e according to the present exemplary embodiment. Time-divisional processing is performed in a clock cycle that is four times the input image. With respect to three inputs y, u+128, and v+128, the multiplexers 244a and 204 are controlled. The contrast correction and chroma correction are performed in this order, and Y data and U+128 data after correction, are temporarily held in a buffer (not shown) for the purpose of adjusting a timing between Y data and U+128 data. The V+128 data after correction that will be subsequently obtained. When the V+128 data is obtained, the Y data, the U+128 data, and the V+128 data after correction are output.

As described in the fourth exemplary embodiment, the contrast correction and chroma correction may basically be implemented using the same correction curve. Thus, according to the present exemplary embodiment, it is possible to simplify the configuration of, a table ROM memory to store the coefficient F[ ], a circuit to store the coefficient F[ ], and a product sum operating unit corresponding to the respective data by sharing a table that stores the coefficient F[ ], that specifies the correction curve and by time-divisionally processing data (Y, U, and V data) to be corrected.

Sixth Exemplary Embodiment

In the first to fifth exemplary embodiments described so far, instead of storing data corresponding to the correction curve in the LUT during image correction, only the desired minimum coefficient data is stored in a table. Real-time correction is performed on input image data using a table of coefficient data and the product sum operation. This method has an advantage that a relative mass LUT memory to store data corresponding to the correction curve is not required. Since this method requires the product sum operation for every pixel data, power consumption may increase due to computation. Thus, in the sixth to eighth exemplary embodiments described below, provided is an approach in which the LUT that stores the correction curve is used and the LUT is efficiently created according to the present invention.

Figure 17:
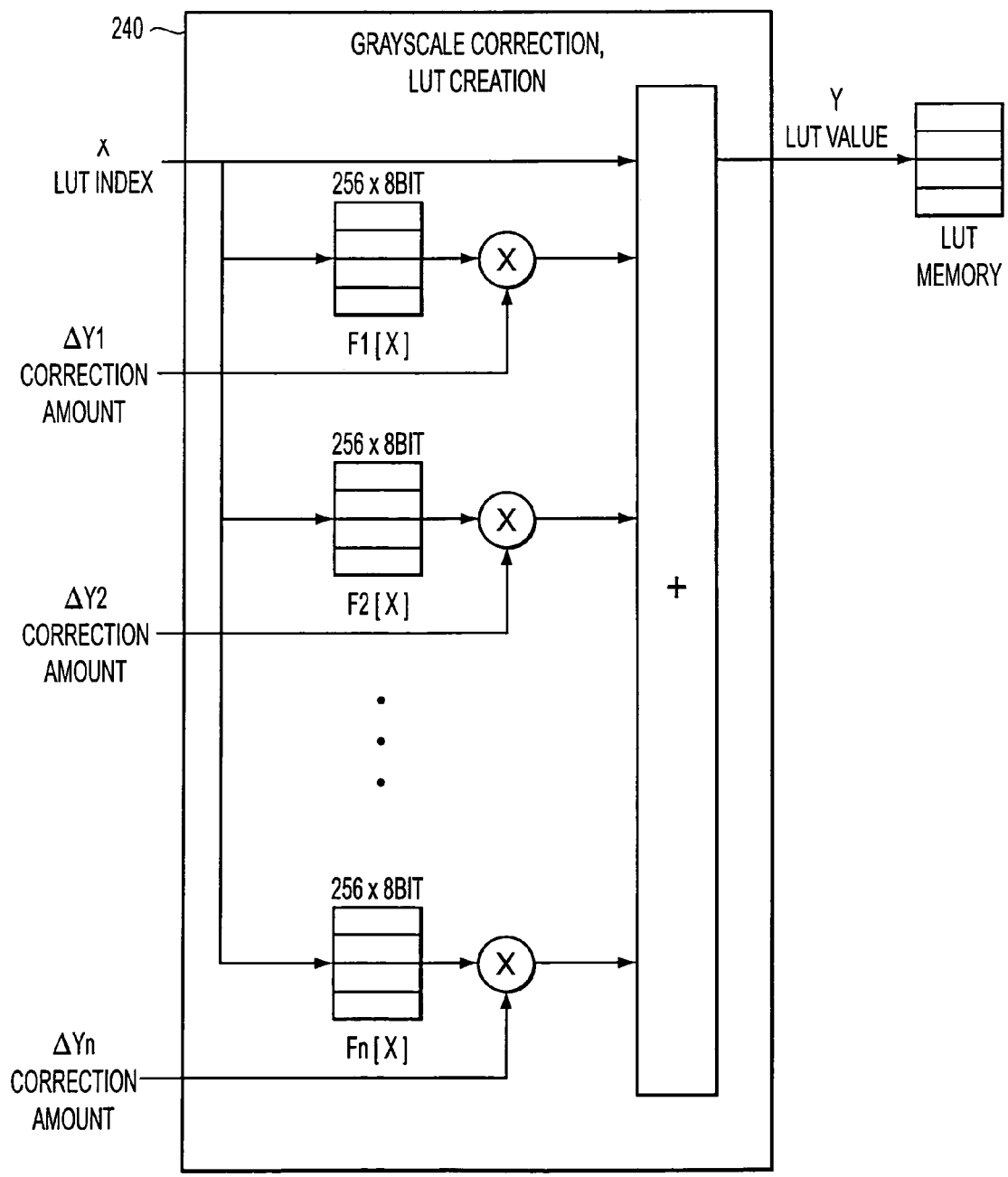
FIG. 17 is a schematic of the configuration of an LUT creating unit according to a sixth exemplary embodiment of the present invention.

FIG. 17 illustrates the configuration of a grayscale correction LUT creating unit according to the present exemplary embodiment. Correction amounts ΔY1 to ΔYn are input to the grayscale correction LUT creating unit 280. At the same time, grayscale values (0 to 255) that can be extracted from image data to be corrected are input in turn to the grayscale correction LUT creating unit 280 as LUT indexes. By adding the product of a correction amount and the coefficient F[ ] determined by an input grayscale value to the input grayscale value based on the correction amount, an LUT value, which should be stored in the LUT memory, can be obtained. Thus, it is possible to produce an LUT for image correction by performing the product sum operation as many as the number of grayscales extracted from the input image data.

Seventh Exemplary Embodiment

Figure 18:
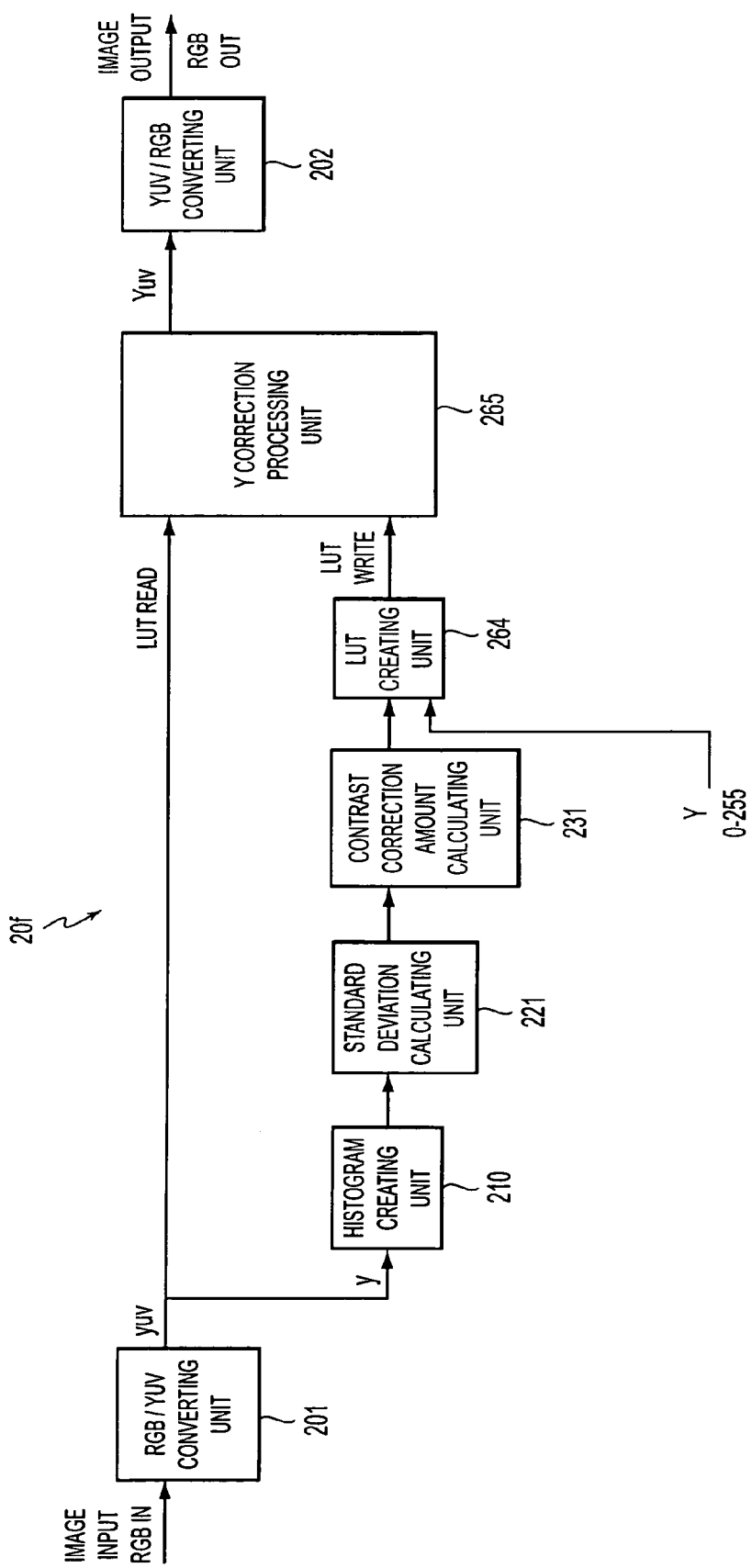
FIG. 18 is a schematic of the configuration of an image processor according to a seventh exemplary embodiment of the present invention.

The seventh exemplary embodiment relates to creating an LUT of a correction curve in the sixth exemplary embodiment, and particularly, to applying the LUT to contrast correction. FIG. 18 illustrates the configuration of an image processor 20f according to the present exemplary embodiment. As shown in FIG. 18, the image processor 20f includes an RGB/YUV converting unit 201, a YUV/RGB converting unit 202, a histogram creating unit 210, a standard deviation calculating unit 221, a contrast correction amount calculating unit 231, an LUT creating unit 264, and a Y correction processing unit 265. Here, the RGB/YUV converting unit 201, the YUV/RGB converting unit 202, the histogram creating unit 210, the standard deviation calculating unit 221, and the contrast correction calculating unit 231 are similar to those of the second exemplary embodiment, shown in FIG. 6 and will not described here.

Figure 19:
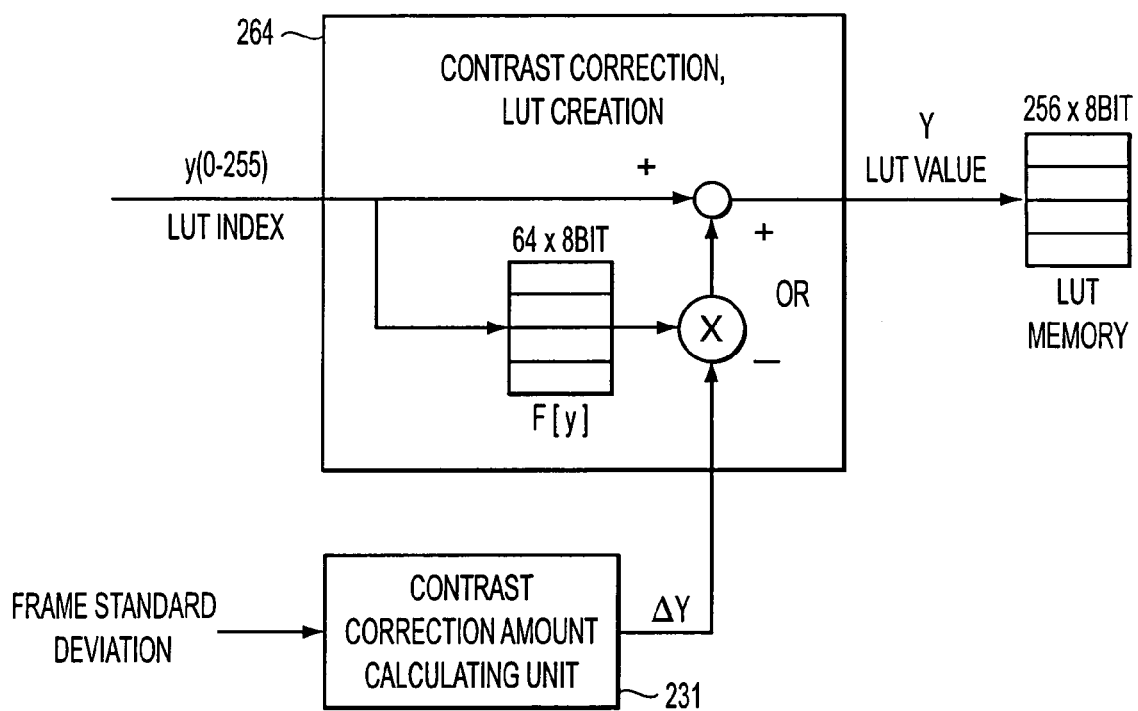
FIG. 19 is a schematic of the configuration of an LUT creating unit according to the seventh exemplary embodiment of the present invention.

FIG. 19 illustrates an exemplary configuration of the LUT creating unit 264. The product of the contrast correction amount ΔY and the coefficient F[ ] determined by input grayscales ranging from 0 to 255 is added to an input grayscale. The resulting value is stored in an LUT memory as an LUT value. The LUT memory can be provided in the Y correction processing unit 265. As shown in FIG. 18, the Y correction processing unit 265 determines an output grayscale using the original data y supplied from the RGB/YUV converting unit 201 as an input grayscale with reference to the LUT memory and outputs the determined output grayscale to the YUV/RGB converting unit 202.

In the present exemplary embodiment, until the LUT is created in the LUT memory, the LUT creating unit 264 shown in FIG. 19 performs the product sum operation, thereby rapidly creating the LUT. Also, after the LUT is created, data after correction with respect to input image data can be obtained with reference to the LUT. Thus, it is possible to reduce or prevent power consumption from increasing.

The above is the explanation of contrast correction, but chroma correction can be performed in the same way.

Eighth Exemplary Embodiment

Next, an eighth exemplary embodiment of the present invention will be described. The eighth exemplary embodiment relates to creating an LUT of the correction curve according to the sixth exemplary embodiment, and particularly, to applying the LUT to chroma correction. If the LUT is simply applied to chroma correction, one LUT memory for each of the U data and V data is required. However, since the contents to be stored in the LUT memory are the same, inclusion of two memories is a waste of memory. Accordingly, one common LUT memory for U data and V data is provided, and correction is performed by time-divisionally reading out the common LUT memory during chroma contrast processing.

Figure 20:
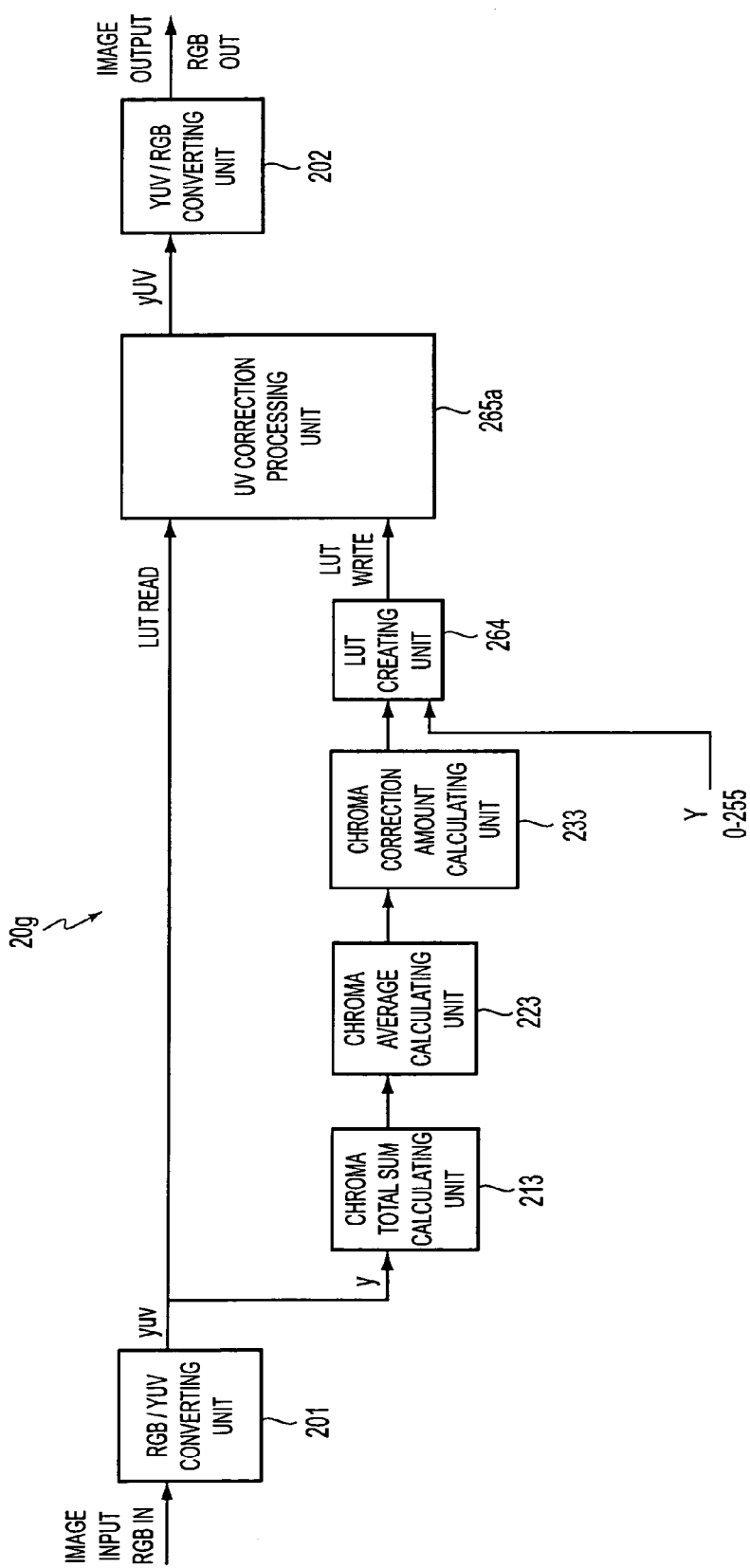
FIG. 20 is a schematic of the configuration of an image processor according to an eighth exemplary embodiment of the present invention.

FIG. 20 illustrates the configuration of an image processing system according to the present exemplary embodiment. An image processing system 20g according to the present invention is basically similar to the image processor 20f according to the seventh exemplary embodiment shown in FIG. 18, except that chroma correction is performed instead of contrast correction. Specifically, in FIG. 20, instead of the histogram creating unit 210, the standard deviation calculating unit 221, and the contrast correction amount calculating unit 231, the chroma total sum calculating unit 213, the chroma average calculating unit 223, and the chroma correction amount calculating unit 233 are provided. In addition, the configurations of the chroma total sum calculating unit 213, the chroma average calculating unit 223, and the chroma correction amount calculating unit 233 are identical to those of the fourth exemplary embodiment, shown in FIG. 11.

Figure 21:
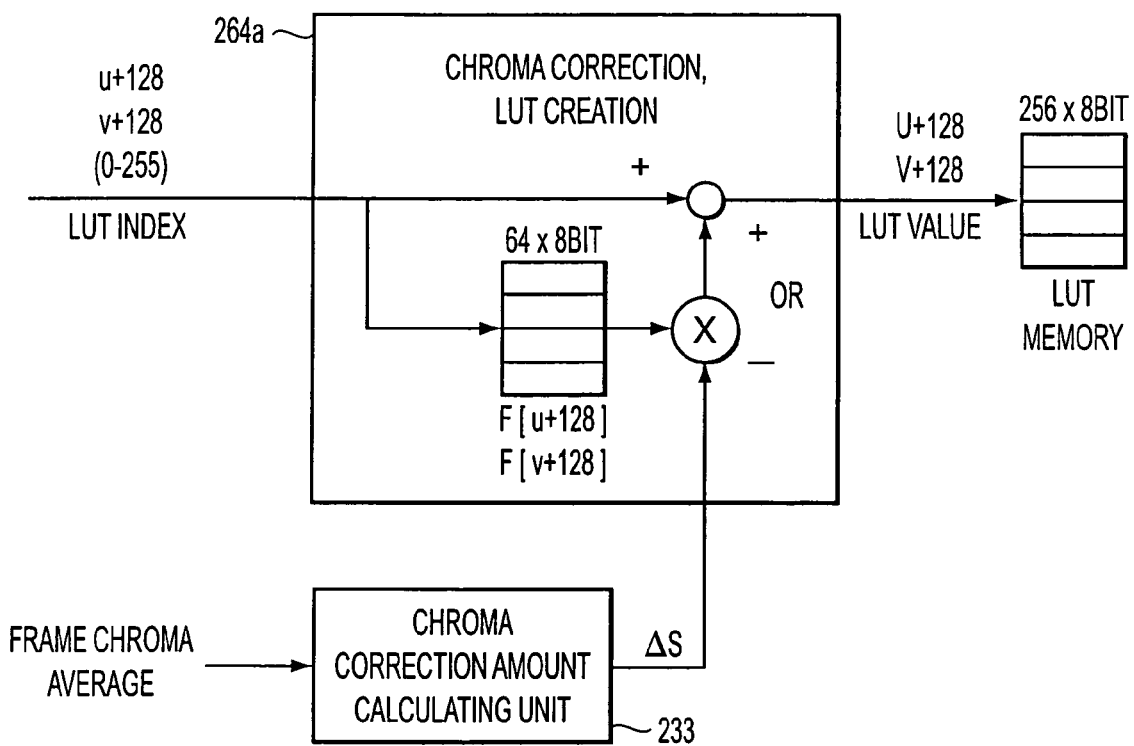
FIG. 21 is a schematic of the configuration of an LUT creating unit according to the eighth exemplary embodiment of the present invention.

FIG. 21 illustrates the configuration of a correction LUT creating unit 264a. Data u+128 and v+128 are input, an LUT value is calculated by adding the product of coefficients corresponding to the inputs and the correction amount ΔS, which is supplied from the chroma correction amount calculating unit 233, to input data. The calculated LUT value is stored in the LUT memory. In creating a correction LUT, a grayscale (0 to 255) is used as an input with respect to either u+128 or v+128, and the LUT memory is created.

Figure 22:
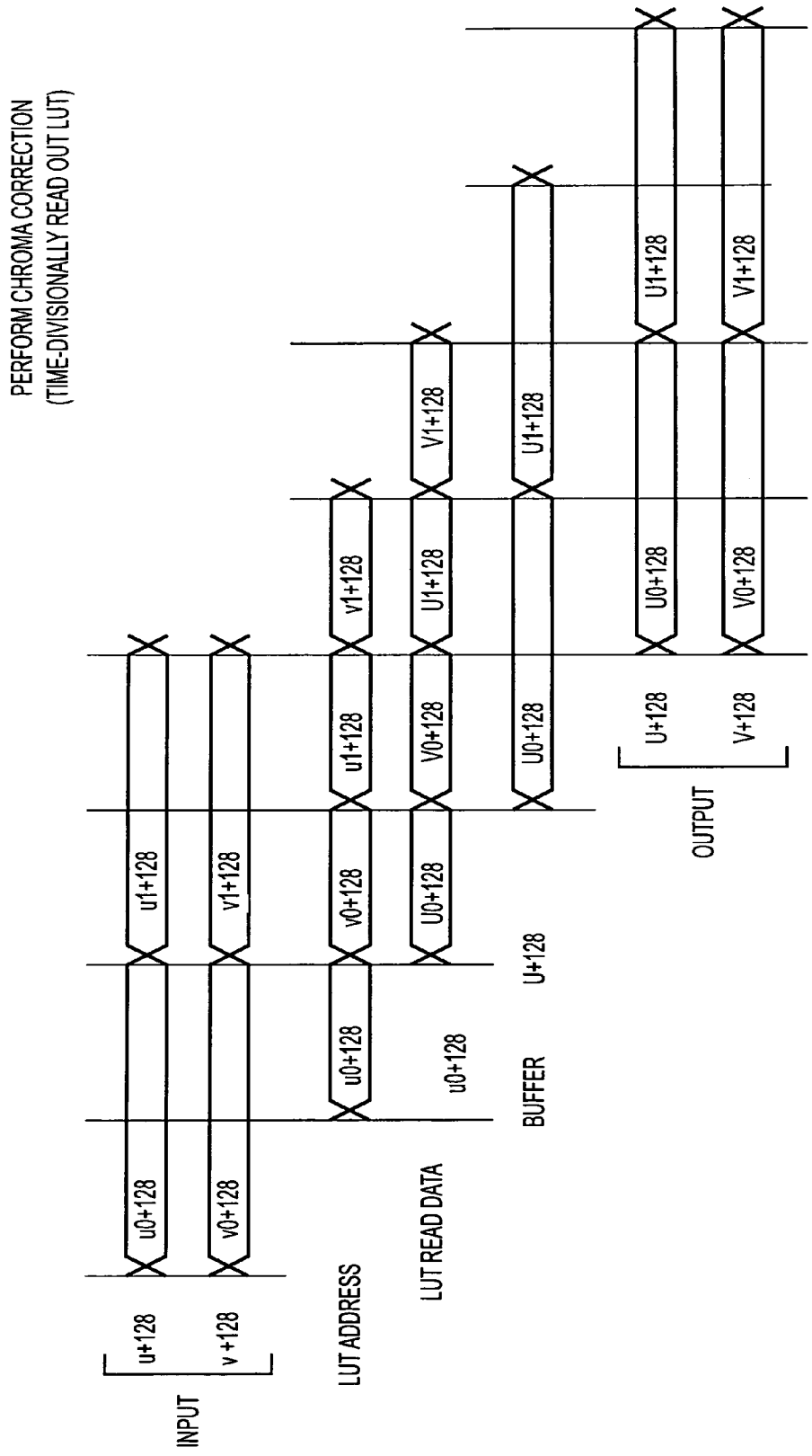
FIG. 22 is a timing chart for chroma correction processing according to the eighth exemplary embodiment of the present invention.

FIG. 22 is a timing chart for chroma contrast processing using the created LUT memory. Since two input data, i.e., u+128 and v+128, are time-divisionally processed, processing is performed in a clock cycle of two times the input data. In FIG. 22, for the inputs u+128 and v+128, an LUT address (an address in the LUT memory) corresponding to a grayscale value of input data is time-divisionally designated, and data read from the designated address is temporarily stored in a buffer. The buffer is provided to store U data after chroma correction using the LUT memory and to adjust a timing between V data and the U data. If V data (V+128) after chroma correction is obtained at the next timing, the V data (V+128) is output to the YUV/RGB converting unit 202, together with U data (U+128) after correction that is temporarily stored in the buffer.

In addition, in the present exemplary embodiment, a clock frequency of a memory must be two times that of input image data. However, since an operating frequency of the memory is sufficiently high as compared to a pixel frequency at a general image rate, such a clock frequency is a small matter. Therefore, by time-divisionally using a common LUT of the U data and V data; it is possible to reduce the cost as much as the cost for LUT memory.

What is claimed is:

1. An image processor that corrects input image data having a predetermined grayscale range, comprising:
   a coefficient holding device to hold correction coefficients of a correction curve that correspond to the entire grayscale range or a portion of the grayscale range and include one or more correction points and a combination portion that is formed of a combination of a plurality of specific curve pattern portions, the one or more correction points being determined previously and independently of the input image data, and the coefficient holding device holding only the correction coefficients corresponding to one of the specific curve pattern portions in the combination portion, the held correction coefficients including a plurality of previously calculated values corresponding to a range of grayscale values of the input image data;
   a correction amount determination device to determine a correction amount based on statistical information of grayscale values of pixels in the input image data; and
   a correction device to correct the input image data by adding a product of the correction amount and the correction coefficients determined by the input image data to the input image data, the correction device including a device to generate correction coefficients corresponding to the combination portion based on the correction coefficients corresponding to the specific curve pattern portion, each of the specific curve pattern portions including a plurality of points that show a pattern of the specific curve pattern portion.

2. The image processor according to claim 1,
   the combination portion including a portion symmetric with the specific curve pattern portion with respect to a horizontal axis or a vertical axis of the correction curve used as a reference axis.

3. The image processor according to claim 1,
   the correction points being two points that are symmetric with respect to the center of the grayscale range, and
   the coefficient holding device holding correction coefficients that make absolute values of the correction amount at the two points equal and have opposite polarities.

4. The image processor according to claim 1,
   the correction points being two points that are a quarter of the lower limit of the grayscale range and a quarter of the upper limit of the grayscale range, and
   the coefficient holding device holding correction coefficients that make the absolute values of the correction amount at the two points equal and have opposite polarities.

5. The image processor according to claim 1,
   the correction point being one of the two points that are symmetric with respect to the center of the grayscale range.

6. The image processor according to claim 1,
   the correction device performing luminance correction and color difference correction on the input image data using the same correction coefficients held by the coefficient holding device.

7. The image processor according to claim 6,
   the correction device simultaneously performs the luminance correction and the color difference correction by time-divisionally referring to the coefficient holding device.

8. An image processor that corrects input image data having a predetermined grayscale range, comprising:
   a coefficient holding device to hold correction coefficients of a correction curve that correspond to the entire grayscale range or a portion of the grayscale range and include one or more correction points and a combination portion that is formed of a combination of a plurality of specific curve pattern portions, the one or more correction points being determined previously and independently of the input image data, and the coefficient holding device holding only the correction coefficients corresponding to one of the specific curve pattern portions in the combination portion, the held correction coefficients including a plurality of previously calculated values corresponding to a range of grayscale values of the input image data;
   a correction amount determination device to determine a correction amount based on statistical information of grayscale values of pixels in the input image data;
   a correction curve data generating device to generate and store correction curve data with respect to all grayscale values corresponding to the grayscale range with reference to the coefficient holding device by adding a product of the correction amount and the correction coefficient corresponding to each of the grayscale values to each of the grayscale values; and
   a correction device to perform grayscale correction on the input image data with reference to the correction curve data, the correction device including a device to generate correction coefficients corresponding to the combination portion based on the correction coefficients corresponding to the specific curve pattern portion, each of the specific curve pattern portions including a plurality of points that show a pattern of the specific curve pattern portion.

9. The image processor according to claim 8,
the correction points being two points that are symmetric with respect to the center of the grayscale range, and
the coefficient holding device holding correction coefficients that make absolute values of the correction amount at the two points equal and have opposite polarities.

10. The image processor according to claim 8,
the correction points being two points that are a quarter of the lower limit of the grayscale range and a quarter of the upper limit of the grayscale range, and
the coefficient holding device holding correction coefficients that make the absolute values of the correction amount at the two points equal and have opposite polarities.

11. The image processor according to claim 8,
the correction point being one of the two points that are symmetric with respect to the center of the grayscale range.

12. The image processor according to claim 8,
the correction including chroma correction that corrects two color difference data of the input image data, and
the correction device performing correction on the two color difference data by time-divisionally referring to the same correction curve data.

13. An image processing method that corrects input image data having a predetermined grayscale range, comprising:
holding correction coefficients of a correction curve that correspond to the entire grayscale range or a portion of the grayscale range and include one or more correction points and a combination portion that is formed of a combination of a plurality of specific curve pattern portions, the one or more correction points being determined previously and independently of the input image data, and the holding the correction coefficients holding only the correction coefficients corresponding to one of the specific curve pattern portions in the combination portion, the held correction coefficients including a plurality of previously calculated values corresponding to a range of grayscale values of the input image data;
determining a correction amount based on statistical information of grayscale values of pixels in the input image data; and
performing grayscale correction on the input image data by adding a product of the correction amount and the correction coefficients determined by the input image data to the input image data, the performing the grayscale correction including generating correction coefficients corresponding to the combination portion based on the correction coefficients corresponding to the specific curve pattern portion, each of the specific curve pattern portions including a plurality of points that show a pattern of the specific curve pattern portion.

14. An image processing method that corrects input image data having a predetermined grayscale range, comprising:
holding correction coefficients of a correction curve that correspond to the entire grayscale range or a portion of the grayscale range and include one or more correction points and a combination portion that is formed of a combination of a plurality of specific curve pattern portions, the one or more correction points being determined previously and independently of the input image data, and the holding the correction coefficients holding only the correction coefficients corresponding to one of the specific curve pattern portions in the combination portion, the held correction coefficients including a plurality of previously calculated values corresponding to a range of grayscale values of the input image data;
determining a correction amount based on statistical information of grayscale values in the input image data;
generating and storing correction curve data with respect to all grayscale values corresponding to the grayscale range by adding a product of the correction amount and the correction coefficient corresponding to each of the grayscale values to each of the grayscale values; and
performing grayscale correction on the input image data with reference to the correction curve data, the performing the grayscale correction including generating correction coefficients corresponding to the combination portion based on the correction coefficients corresponding to the specific curve pattern portion, each of the specific curve pattern portions including a plurality of points that show a pattern of the specific curve pattern portion.

15. A computer-readable recording medium on which an image processing program is recorded, the image processing program correcting input image data having a predetermined grayscale range and being executable by a computer, the program comprising:
instructions to hold correction coefficients of a correction curve that correspond to the entire grayscale range or a portion of the grayscale range and include one or more correction points and a combination portion that is formed of a combination of a plurality of specific curve pattern portions, the one or more correction points being determined previously and independently of the input image data, and the instruction to hold the correction coefficients holding only the correction coefficients corresponding to one of the specific curve pattern portions in the combination portion, the held correction coefficients including a plurality of previously calculated values corresponding to a range of grayscale values of the input image data;
instructions to determine a correction amount based on statistical information of grayscale values of pixels in the input image data; and
instructions to perform grayscale correction on the input image data by adding a product of the correction amount and the correction coefficients determined by the input image data to the input image data, the instructions to perform the grayscale correction including instructions to generate correction coefficients corresponding to the combination portion based on the correction coefficients corresponding to the specific curve pattern portion, each of the specific curve pattern portions including a plurality of points that show a pattern of the specific curve pattern portion.

16. A computer-readable recording medium on which an image processing program is recorded, the image processing program correcting input image data having a predetermined grayscale range and being executable by a computer, the program comprising:
instructions to hold correction coefficients of a correction curve that corresponds to the entire grayscale range or a portion of the grayscale range and include one or more correction points and a combination portion that is formed of a combination of a plurality of specific curve pattern portions, the one or more correction points being determined previously and independently of the input image data, and the instructions to hold the correction coefficients holding only the correction coefficients corresponding to one of the specific curve pattern portions in the combination portion, the held correction coefficients including a plurality of previously calculated values corresponding to a range of grayscale values of the input image data;

instructions to determine a correction amount based on statistical information of grayscale values of pixels in the input image data;

instructions to generate and store correction curve data with respect to all grayscale values corresponding to the grayscale range by adding a product of the correction amount and the correction coefficient corresponding to each of the grayscale values to each of the grayscale values; and instructions to perform grayscale correction on the input image data with reference to the correction curve data, the instructions to perform the grayscale correction including instructions to generate correction coefficients corresponding to the combination portion based on the correction coefficients corresponding to the specific curve pattern portion, each of the specific curve pattern portions including a plurality of points that show a pattern of the specific curve pattern portion.

* * * * *